US008665581B2

(12) United States Patent
Fleischer et al.

(10) Patent No.: US 8,665,581 B2
(45) Date of Patent: Mar. 4, 2014

(54) SPIRAL WOUND ELECTRICAL DEVICES CONTAINING CARBON NANOTUBE-INFUSED ELECTRODE MATERIALS AND METHODS AND APPARATUSES FOR PRODUCTION THEREOF

(75) Inventors: Corey Adam Fleischer, Columbia, MD (US); Tushar K. Shah, Columbia, MD (US); Lawrence P. Hetzel, Fallston, MD (US); Harry C. Malecki, Abingdon, MD (US)

(73) Assignee: Applied Nanostructured Solutions, LLC, Baltimore, MD (US)

( * ) Notice: Subject to any disclaimer, the term of this patent is extended or adjusted under 35 U.S.C. 154(b) by 182 days.

(21) Appl. No.: 13/039,025

(22) Filed: Mar. 2, 2011

(65) Prior Publication Data

US 2011/0242731 A1    Oct. 6, 2011

Related U.S. Application Data

(60) Provisional application No. 61/309,828, filed on Mar. 2, 2010.

(51) Int. Cl.
    *H01G 9/00*    (2006.01)
(52) U.S. Cl.
    USPC ........... 361/502; 361/503; 361/504; 361/512; 361/529; 361/525
(58) Field of Classification Search
    USPC ......... 361/502, 503–504, 508–512, 516–519, 361/523–525, 528–529
    See application file for complete search history.

(56) References Cited

U.S. PATENT DOCUMENTS

| 2,883,306 | A | 4/1959 | Cotter |
| 4,065,592 | A | 12/1977 | McAllister |
| 4,104,083 | A | 8/1978 | Hirano |
| 4,313,084 | A | 1/1982 | Hosokawa et al. |

(Continued)

FOREIGN PATENT DOCUMENTS

| CN | 1970612 A | 5/2007 |
| CN | 101698975 | 4/2010 |

(Continued)

OTHER PUBLICATIONS

Hou et al., "A resistance-based damage location sensor for carbon-fibre composites", Smart Materials and Structures, Nov. 4, 2002, vol. 11, pp. 966-969.

(Continued)

*Primary Examiner* — Nguyen T Ha
(74) *Attorney, Agent, or Firm* — McDermott Will Emery LLP

(57) ABSTRACT

Electrical devices having electrodes containing carbon nanotubes infused to a substrate are described herein. The electrical devices contain at least a first electrode material containing a first plurality of carbon nanotubes infused to a first substrate and a second electrode material containing a second plurality of carbon nanotubes infused to a second substrate. The first electrode material and the second electrode material are wound in a spiral configuration about a central axis. The electrical devices can be supercapacitors, which also contain at least an electrolyte in contact with the first electrode material and the second electrode material, and a first separator material disposed between the first electrode material and the second electrode material. Methods and apparatuses for making the electrical devices are also disclosed herein.

16 Claims, 11 Drawing Sheets

(56) References Cited

U.S. PATENT DOCUMENTS

| | | |
|---|---|---|
| 4,488,203 A | 12/1984 | Muranaka et al. |
| 4,515,107 A | 5/1985 | Fournier et al. |
| 4,530,750 A | 7/1985 | Alsenberg et al. |
| 4,581,284 A | 4/1986 | Eggert et al. |
| 4,707,349 A | 11/1987 | Hjersted |
| 4,920,917 A | 5/1990 | Nakatani et al. |
| 5,093,155 A | 3/1992 | Miyazaki et al. |
| 5,103,067 A | 4/1992 | Aldissi |
| 5,130,194 A | 7/1992 | Baker et al. |
| 5,156,225 A | 10/1992 | Murrin |
| 5,173,367 A | 12/1992 | Liimatta et al. |
| 5,221,605 A | 6/1993 | Bard et al. |
| 5,238,808 A | 8/1993 | Bard et al. |
| 5,246,794 A | 9/1993 | Blomgren et al. |
| 5,310,687 A | 5/1994 | Bard et al. |
| 5,449,574 A | 9/1995 | Higley |
| 5,470,408 A | 11/1995 | Nielson et al. |
| 5,514,217 A | 5/1996 | Niino et al. |
| 5,547,525 A | 8/1996 | Bennett et al. |
| 5,571,749 A | 11/1996 | Matsuda et al. |
| 5,581,438 A | 12/1996 | Halliop |
| 5,583,318 A | 12/1996 | Powell |
| 5,639,984 A | 6/1997 | Nielson |
| 5,707,758 A | 1/1998 | Iwatsu et al. |
| 5,714,089 A | 2/1998 | Bard et al. |
| 5,731,147 A | 3/1998 | Bard et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |
| 6,146,783 A | 11/2000 | Brohm et al. |
| 6,180,281 B1 | 1/2001 | Schneider et al. |
| 6,184,280 B1 | 2/2001 | Shibuta |
| 6,194,685 B1 | 2/2001 | Rutherford |
| 6,221,154 B1 | 4/2001 | Lee et al. |
| 6,225,565 B1 | 5/2001 | Prysner |
| 6,232,706 B1 | 5/2001 | Dai et al. |
| 6,233,135 B1 | 5/2001 | Farahmandi et al. |
| 6,251,520 B1 | 6/2001 | Blizzard et al. |
| 6,265,466 B1 | 7/2001 | Glatkowski et al. |
| 6,331,209 B1 | 12/2001 | Jang et al. |
| 6,333,016 B1 | 12/2001 | Resasco et al. |
| 6,361,861 B2 | 3/2002 | Gao et al. |
| 6,413,487 B1 | 7/2002 | Resasco et al. |
| 6,420,293 B1 | 7/2002 | Chang et al. |
| 6,430,031 B1 | 8/2002 | Dispennette et al. |
| 6,454,816 B1 | 9/2002 | Lee et al. |
| 6,455,021 B1 | 9/2002 | Saito |
| 6,465,057 B1 | 10/2002 | Nakahigashi et al. |
| 6,479,028 B1 | 11/2002 | Kaner et al. |
| 6,479,030 B1 | 11/2002 | Firsich |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,585,152 B2 | 7/2003 | Farahmandi et al. |
| 6,602,742 B2 | 8/2003 | Maletin et al. |
| 6,639,786 B2 | 10/2003 | Noguchi et al. |
| 6,650,531 B2 | 11/2003 | Ikeda et al. |
| 6,653,619 B2 | 11/2003 | Chin et al. |
| 6,673,392 B2 | 1/2004 | Lee et al. |
| 6,686,537 B1 | 2/2004 | Gareis et al. |
| 6,692,717 B1 | 2/2004 | Smalley et al. |
| 6,765,949 B2 | 7/2004 | Chang |
| 6,773,466 B1 | 8/2004 | Hiratsuka et al. |
| 6,790,425 B1 | 9/2004 | Smalley et al. |
| 6,818,821 B2 | 11/2004 | Fujieda et al. |
| 6,831,826 B2 | 12/2004 | Iwaida et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,934,600 B2 | 8/2005 | Jang et al. |
| 6,936,653 B2 | 8/2005 | McElrath et al. |
| 6,949,237 B2 | 9/2005 | Smalley et al. |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 | 1/2006 | Glatkowski et al. |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,060,326 B2 | 6/2006 | Hiel et al. |
| 7,061,749 B2 | 6/2006 | Liu et al. |
| 7,074,294 B2 | 7/2006 | Dubrow |
| 7,085,125 B2 | 8/2006 | Sung |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,502 B2 | 10/2006 | Smalley et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Den et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,532 B2 | 1/2007 | Liu et al. |
| 7,189,959 B1 | 3/2007 | Morison et al. |
| 7,211,320 B1 | 5/2007 | Cooper et |
| 7,226,643 B2 | 6/2007 | Juang et al. |
| 7,235,159 B2 | 6/2007 | Gu et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,282,260 B2 | 10/2007 | LeGrande et al. |
| 7,289,312 B2 | 10/2007 | Duff, Jr. |
| 7,294,302 B2 | 11/2007 | Kolde et al. |
| 7,312,608 B2 | 12/2007 | Georgeson et al. |
| 7,329,698 B2 | 2/2008 | Noguchi et al. |
| 7,338,684 B1 | 3/2008 | Curliss et al. |
| 7,340,134 B1 | 3/2008 | Hudson, II et al. |
| 7,352,559 B2 | 4/2008 | Sung |
| 7,354,877 B2 | 4/2008 | Rosenberger et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,419,601 B2 | 9/2008 | Cooper et al. |
| 7,431,965 B2 | 10/2008 | Grigorian et al. |
| 7,435,476 B2 | 10/2008 | Viswanathan et al. |
| 7,442,284 B2 | 10/2008 | Ren et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,466,539 B2 | 12/2008 | Dementiev et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,531,267 B2 | 5/2009 | Kim |
| 7,532,454 B2 | 5/2009 | Plee et al. |
| 7,534,486 B2 | 5/2009 | Boerstoel et al. |
| 7,553,341 B2 * | 6/2009 | Pan et al. ............... 29/25.03 |
| 7,563,411 B2 | 7/2009 | Jiang et al. |

(56) References Cited

U.S. PATENT DOCUMENTS

| | | |
|---|---|---|
| 7,563,428 B2 | 7/2009 | Resasco et al. |
| 7,569,425 B2 | 8/2009 | Huang et al. |
| 7,579,112 B2 | 8/2009 | Chiang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,612,985 B2 | 11/2009 | Dementiev et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,771,798 B1 | 8/2010 | Grosse et al. |
| 7,776,777 B2 | 8/2010 | Kim et al. |
| 7,793,653 B2 | 9/2010 | Kuckelkorn et al. |
| 7,811,632 B2 | 10/2010 | Eres |
| 7,815,820 B2 | 10/2010 | Tan et al. |
| 7,816,709 B2 | 10/2010 | Balzano et al. |
| 7,820,329 B2 | 10/2010 | Boulton et al. |
| 7,862,795 B2 | 1/2011 | Zhang et al. |
| 7,871,591 B2 | 1/2011 | Harutyunyan et al. |
| 7,880,376 B2 | 2/2011 | Takai et al. |
| 7,881,043 B2 * | 2/2011 | Hirose et al. ............... 361/502 |
| 7,927,701 B2 | 4/2011 | Curliss et al. |
| 2002/0035170 A1 | 3/2002 | Glatkowski et al. |
| 2002/0048143 A1 | 4/2002 | Lee et al. |
| 2002/0085968 A1 | 7/2002 | Smalley et al. |
| 2002/0098135 A1 | 7/2002 | Smalley et al. |
| 2002/0136683 A1 | 9/2002 | Smalley et al. |
| 2003/0042147 A1 | 3/2003 | Talin et al. |
| 2003/0044678 A1 | 3/2003 | Winarski |
| 2003/0055153 A1 | 3/2003 | Luippold et al. |
| 2003/0102585 A1 | 6/2003 | Poulin et al. |
| 2003/0111333 A1 | 6/2003 | Montgomery et al. |
| 2003/0143453 A1 | 7/2003 | Ren et al. |
| 2004/0007955 A1 | 1/2004 | Yaniv et al. |
| 2004/0018375 A1 | 1/2004 | Banno et al. |
| 2004/0026234 A1 | 2/2004 | Vanden Brande et al. |
| 2004/0055631 A1 | 3/2004 | Szymocha et al. |
| 2004/0071870 A1 | 4/2004 | Knowles et al. |
| 2004/0082247 A1 | 4/2004 | Desai et al. |
| 2004/0096389 A1 | 5/2004 | Lobovsky et al. |
| 2004/0105807 A1 | 6/2004 | Fan et al. |
| 2004/0111141 A1 | 6/2004 | Brabec et al. |
| 2004/0184981 A1 | 9/2004 | Liu et al. |
| 2004/0197546 A1 | 10/2004 | Rinzler et al. |
| 2004/0210289 A1 | 10/2004 | Wang et al. |
| 2004/0241532 A1 | 12/2004 | Kim |
| 2004/0245088 A1 | 12/2004 | Gardner |
| 2004/0253167 A1 | 12/2004 | Silva et al. |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0113876 A1 | 5/2005 | Weiner et al. |
| 2005/0119371 A1 | 6/2005 | Drzal et al. |
| 2005/0170177 A1 | 8/2005 | Crawford et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0214648 A1 | 9/2005 | Boulton et al. |
| 2005/0231893 A1 | 10/2005 | Harvey |
| 2005/0238810 A1 | 10/2005 | Scaringe et al. |
| 2005/0260412 A1 | 11/2005 | Gardner |
| 2005/0263456 A1 | 12/2005 | Cooper et al. |
| 2006/0052509 A1 | 3/2006 | Saitoh |
| 2006/0054866 A1 | 3/2006 | Ait-Haddou et al. |
| 2006/0110599 A1 | 5/2006 | Honma et al. |
| 2006/0121275 A1 | 6/2006 | Poulin et al. |
| 2006/0126268 A1 | 6/2006 | Sung |
| 2006/0159916 A1 | 7/2006 | Dubrow et al. |
| 2006/0177602 A1 | 8/2006 | Dijon et al. |
| 2006/0198956 A1 | 9/2006 | Eres |
| 2006/0233692 A1 | 10/2006 | Scaringe et al. |
| 2006/0241236 A1 | 10/2006 | Kuznetsov et al. |
| 2006/0249203 A1 | 11/2006 | Li et al. |
| 2006/0253942 A1 | 11/2006 | Barrera et al. |
| 2007/0020167 A1 | 1/2007 | Han et al. |
| 2007/0036709 A1 | 2/2007 | Lashmore et al. |
| 2007/0048521 A1 | 3/2007 | Istvan |
| 2007/0054105 A1 | 3/2007 | Hsiao |
| 2007/0062799 A1 | 3/2007 | Lee |
| 2007/0070579 A1 | 3/2007 | Sung |
| 2007/0076349 A1 | 4/2007 | Dementiev et al. |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0134555 A1 | 6/2007 | Ren et al. |
| 2007/0135588 A1 | 6/2007 | Diakoumakos et al. |
| 2007/0166603 A1 | 7/2007 | Nakanishi et al. |
| 2007/0189953 A1 | 8/2007 | Bai et al. |
| 2007/0237990 A1 | 10/2007 | Kim |
| 2007/0241962 A1 | 10/2007 | Shinoda et al. |
| 2007/0259128 A1 | 11/2007 | Parsapour |
| 2008/0010796 A1 | 1/2008 | Pan et al. |
| 2008/0014431 A1 | 1/2008 | Lashmore et al. |
| 2008/0020193 A1 | 1/2008 | Jang et al. |
| 2008/0048364 A1 | 2/2008 | Armelades et al. |
| 2008/0049380 A1 | 2/2008 | Miyahara et al. |
| 2008/0053922 A1 | 3/2008 | Honsinger, Jr. et al. |
| 2008/0057265 A1 | 3/2008 | Liang et al. |
| 2008/0063585 A1 | 3/2008 | Smalley et al. |
| 2008/0075954 A1 | 3/2008 | Wardle et al. |
| 2008/0102371 A1 | 5/2008 | Mitchell et al. |
| 2008/0117562 A1 | 5/2008 | Maruyama et al. |
| 2008/0118753 A1 | 5/2008 | Poulin et al. |
| 2008/0137890 A1 | 6/2008 | Petersen et al. |
| 2008/0146440 A1 | 6/2008 | Westin et al. |
| 2008/0160286 A1 | 7/2008 | Asrar et al. |
| 2008/0170982 A1 | 7/2008 | Zhang et al. |
| 2008/0173111 A1 | 7/2008 | Thostenson et al. |
| 2008/0182108 A1 | 7/2008 | Curliss et al. |
| 2008/0187482 A1 | 8/2008 | Chen et al. |
| 2008/0187648 A1 | 8/2008 | Hart et al. |
| 2008/0195187 A1 | 8/2008 | Li et al. |
| 2008/0212261 A1 | 9/2008 | Ajayan et al. |
| 2008/0247938 A1 | 10/2008 | Tsai et al. |
| 2008/0248192 A1 | 10/2008 | Long et al. |
| 2008/0248362 A1 | 10/2008 | Sayre et al. |
| 2008/0251971 A1 | 10/2008 | Kim et al. |
| 2008/0273290 A1 | 11/2008 | Dementiev et al. |
| 2008/0279753 A1 | 11/2008 | Harutyunyan |
| 2008/0286564 A1 | 11/2008 | Tsotsis |
| 2008/0297980 A1 | 12/2008 | Bourcier et al. |
| 2009/0017301 A1 | 1/2009 | Moireau |
| 2009/0020734 A1 | 1/2009 | Jang et al. |
| 2009/0029127 A1 | 1/2009 | Watanabe et al. |
| 2009/0047453 A1 | 2/2009 | Folaron et al. |
| 2009/0047502 A1 | 2/2009 | Folaron et al. |
| 2009/0053512 A1 | 2/2009 | Pyun et al. |
| 2009/0059474 A1 | 3/2009 | Zhamu et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0087743 A1 | 4/2009 | Kim et al. |
| 2009/0092832 A1 | 4/2009 | Moireau |
| 2009/0098453 A1 | 4/2009 | Liu et al. |
| 2009/0099016 A1 | 4/2009 | Carruthers et al. |
| 2009/0117269 A1 | 5/2009 | Hansen et al. |
| 2009/0121219 A1 | 5/2009 | Song et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0181309 A1 | 7/2009 | Kwon et al. |
| 2009/0185327 A1 | 7/2009 | Seymour |
| 2009/0186214 A1 | 7/2009 | Lafdi et al. |
| 2009/0186276 A1 | 7/2009 | Zhamu et al. |

(56) References Cited

U.S. PATENT DOCUMENTS

| | | |
|---|---|---|
| 2009/0191352 A1 | 7/2009 | DuFaux et al. |
| 2009/0192241 A1 | 7/2009 | Raravikar et al. |
| 2009/0208743 A1 | 8/2009 | Pettit |
| 2009/0212430 A1 | 8/2009 | Wyland |
| 2009/0214800 A1 | 8/2009 | Saito |
| 2009/0220409 A1 | 9/2009 | Curliss et al. |
| 2009/0226673 A1 | 9/2009 | Friedersdorf et al. |
| 2009/0244810 A1 | 10/2009 | Reynolds |
| 2009/0258164 A1 | 10/2009 | Nakai et al. |
| 2009/0262484 A1 | 10/2009 | Miyagi |
| 2009/0272946 A1 | 11/2009 | Lu |
| 2009/0282671 A1 | 11/2009 | Tao et al. |
| 2009/0286079 A1 | 11/2009 | Barker et al. |
| 2009/0294022 A1 | 12/2009 | Hayes et al. |
| 2009/0294753 A1 | 12/2009 | Hauge et al. |
| 2009/0311166 A1 | 12/2009 | Hart et al. |
| 2009/0314510 A1 | 12/2009 | Kukowski et al. |
| 2010/0000520 A1 | 1/2010 | Vachon |
| 2010/0000754 A1 | 1/2010 | Mann et al. |
| 2010/0000770 A1 | 1/2010 | Gupta et al. |
| 2010/0035124 A1 | 2/2010 | Thompson et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0159240 A1 | 6/2010 | Shah et al. |
| 2010/0173228 A1 | 7/2010 | Wallace et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0203362 A1 | 8/2010 | Lam et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0227155 A1 | 9/2010 | Bao et al. |
| 2010/0254885 A1 | 10/2010 | Menchhofer et al. |
| 2010/0258111 A1 | 10/2010 | Shah et al. |
| 2010/0270069 A1 | 10/2010 | Shar et al. |
| 2010/0271253 A1 | 10/2010 | Shah et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0024409 A1 | 2/2011 | Shah et al. |
| 2011/0024694 A1 | 2/2011 | Shah et al. |
| 2011/0036829 A1 | 2/2011 | Fugetsu et al. |
| 2011/0089958 A1 | 4/2011 | Malecki et al. |
| 2011/0123735 A1 | 5/2011 | Shah et al. |
| 2011/0124253 A1 | 5/2011 | Shah et al. |
| 2011/0124483 A1 | 5/2011 | Shah et al. |
| 2011/0143087 A1 | 6/2011 | Alberding et al. |
| 2011/0163274 A1 | 7/2011 | Plee et al. |
| 2011/0171469 A1 | 7/2011 | Shah et al. |
| 2011/0174519 A1 | 7/2011 | Shah et al. |
| 2011/0186775 A1 | 8/2011 | Shah et al. |
| 2011/0216476 A1 | 9/2011 | Fleischer et al. |
| 2011/0235240 A1 | 9/2011 | Lu et al. |
| 2011/0281068 A1 | 11/2011 | David et al. |
| 2011/0287318 A1 | 11/2011 | Loveness et al. |
| 2011/0297892 A1 | 12/2011 | Shah et al. |
| 2011/0304964 A1 | 12/2011 | Fleischer et al. |
| 2012/0000691 A1 | 1/2012 | Shah et al. |
| 2012/0052363 A1 | 3/2012 | Fleischer et al. |

FOREIGN PATENT DOCUMENTS

| | | |
|---|---|---|
| IN | 01900DE2008 A | 3/2010 |
| JP | 2004/247064 A | 9/2004 |
| JP | 2004-247064 A | 9/2004 |
| KR | 100829001 | 5/2008 |
| TW | 200833861 | 8/2008 |
| WO | WO 03082733 | 10/2003 |
| WO | WO 2006/048531 | 5/2006 |
| WO | WO 2006/115486 | 11/2006 |
| WO | WO 2007/015710 | 2/2007 |
| WO | WO 2007/061854 | 5/2007 |
| WO | WO 2007/089118 | 8/2007 |
| WO | WO 2007/149109 | 12/2007 |
| WO | WO 2008/012196 | 1/2008 |
| WO | WO 2008/041183 | 4/2008 |
| WO | WO 2008/054541 | 5/2008 |
| WO | WO 2008/085634 | 7/2008 |
| WO | WO-2008085550 A2 | 7/2008 |
| WO | WO 2008/115168 A2 | 9/2008 |
| WO | WO 2008/115640 | 9/2008 |
| WO | WO 2008/145787 A1 | 12/2008 |
| WO | WO 2009/004346 | 1/2009 |
| WO | WO 2009110885 | 9/2009 |

OTHER PUBLICATIONS

Thostenson et al., "Real-time in situ sensing of damage evolution in advanced fiber compositions using carbon nanotube networks", Nanotechnology, Apr. 23, 2008, vol. 19.

Arepalli, et al., "Carbon-Nanotube-Based Electrochemical Double-Layer Capacitor Technologies for Spaceflight Applications,"JOM, Dec. 2005, pp. 26-31.

Zhao, et al., "Carbon Nanosheets As the Electrode Material in Supercapacitors," Journal of Power Sources 194 (2009 pp. 1208-1212.

Garcia, et al., "Fabrication and multifunctional properties of a hybrid laminate with aligned carbon nanotubes grown In Situ", Composites Science and Technology, Jul. 1, 2008, pp. 2034-2041, vol. 68, No. 9.

U.S. Appl. No. 12/766,817, filed Apr. 23, 2010, Tushar K. Shah.

U.S. Appl. No. 61/295,621, filed Jan. 15, 2010, Harry C. Malecki.

U.S. Appl. No. 61/297,704, filed Jan. 22, 2010, Tushar K. Shah

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Andrews, et al., "Nanotube Composite Carbon Fibers," Applied Physics Letters, Aug. 1999, vol. 75, No. 9, pp. 1329-1331.

Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore.

Bubert, et al., "Basic analytical investigation of plasma-chemically modified carbon fibers", Spectroch mica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

Ci, et al., "Direct Growth of Carbon Nanotubes on the Surface of Ceramic Fibers", Carbon, 2005, pp. 883-886, vol. 43, No. 4, Elsevier Ltd.

Cui, et al., "Carbon-Silicon Core-Shell Nanowires As High Capacity Electrode for Lithium Ion Batteries," American Chemical Society, vol. xx, No. x.

Fiedler et al, "Can Carbon Nanotubes Be Used to Sense Damage in Composites?", Annales de Chimie-Science des Materiaux, 2004, vol. 29, No. 6, pp. 81-94.

(56) References Cited

OTHER PUBLICATIONS

Franz, et al., "Carbon Single-Wall Nanotube Growth in a Volumetrically Confined Arc Discharge System", U.S. Departement of Energy Journal of Undergraduate Research, pp. 66-69, publication date unknown.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

Hsieh, et al., "Synthesis of Carbon Nanotubes on Carbon Fabric for Use As electrochemical Capacitor," Microporous and Mesoporous Materials, (2009), pp. 155-159, vol. 122.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied_Polymer Science, 2004, pp. 1411-1422, vol. 93, Wiley Periodicals, Inc.

Jo, et al., "Field Emission of Carbon Nanotubes Grown on Carbon Cloth," Applied Physics Letters, Aug. 2, 2004, pp. 810-812, vol. 85, No. 5.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Kramer, et al., Constrained Iron Catalysts for Single-Walled Carbon Nanotube Growth?, Langmuir 2005, 21, 8466-8470 [http://pubs.acs.org/dol/abs/10.1021/la0506729].

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Parrish, "Carbon Nanotubes and Carbon Layer Nanostructured Composites Grown in Improved Process," Capella University, Before It's News, Jul. 9, 2010.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson et al., "Carbon Nanotube Networks: Sensing of distributed Strain and Damage for Life Prediction and Self Healing," Advanced Materials, Oct. 2, 1006, vol. 18, Iss. 21, pp. 2837-2841.

Wang, et al., "Penetration depth of atmospheric pressure plasma surface modification into multiple layers of polyester fabrics", Surface and Coatings Technology, 2007, pp. 77-83, vol. 202, Elsevier B.V.

Wang, et al., "Processing and property investigation of single-walled carbon nanotube (SWNT) buckypaper/epoxy resin matrix nanocomposites", Composites: Part A, 2004, pp. 1225-1232, vol. 35, Elsevier Ltd.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elsevier Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yanagishita, et al., "Carbon Nanotubes with a Triangular Cross-section, Fabricated Using Anodic Porous Alumina as the Temple", Adv. Mater., 204, pp. 429-432, vol. 16, No. 5, Wiley-VCH Verlag GmbH & Co. KGaA, Weinheim.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH.5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang et al., "Integration and characterization of aligned carbon nanotubes on metal/silicon substrates and effects of water", Applied Surface Science 255 (2009) 5003-5008, entire document.

Zhang, et al., "In situ growth of carbon nanotubes on inorganic fibers with different surface properties," Materials Chemistry and Physics, 2008, pp. 317-321, vol. 107, Science Direct.

Zhao et al., "The Use of Carbon Nanotubes to Sense Matrix Stresses Around a Single Glass Fiber," Composites Science and Technology, Nov. 2001, vol. 61, No. 14, pp. 2139-2143.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

* cited by examiner

SPIRAL WOUND ELECTRICAL DEVICES CONTAINING CARBON NANOTUBE-INFUSED ELECTRODE MATERIALS AND METHODS AND APPARATUSES FOR PRODUCTION THEREOF

CROSS-REFERENCE TO RELATED APPLICATIONS

This application claims the benefit of priority under 35 U.S.C. §119 from U.S. Provisional Patent Application Ser. No. 61/309,828, filed Mar. 2, 2010, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to energy storage, and, more specifically, energy storage using carbon nanotubes.

BACKGROUND

Capacitors are electrical devices that are used to accumulate and store electric charge. Capacitors are distinguished from batteries in at least two aspects. First, storage of electric charge in a capacitor is based upon physical charge separation rather than the chemical separation of a battery. Second, charge and discharge rates of a capacitor are much more rapid than the chemical reactions that occur in a battery.

In conventional capacitors, charge separation is maintained by two conductive plates that are separated by a dielectric material. In the presence of an applied potential, an electric field builds in the dielectric material and produces a mechanical force between the conductive plates. The ratio of the electric charge maintained on the conductive plates to the potential difference between them is referred to as the capacitance, which is measured in Farads.

Various modifications of conventional capacitors have also been developed. Electrolytic capacitors utilize an ion-containing liquid as one of its conductive plates. Such electrolytic capacitors typically display much higher capacitance values than do conventional capacitors. However, their utility is somewhat limited by a requirement that each conductive plate is to be maintained in a polarized voltage state.

Supercapacitors, also known as electric double-layer capacitors, electrochemical double-layer capacitors, supercondensors, ultracapacitors, or pseudocapacitors, can display even higher capacitance values. Supercapacitors differ significantly from conventional capacitors and electrolytic capacitors in that there is not a significant physical separation of the conductive plates in a supercapacitor. Instead, supercapacitors maintain charge separation by incorporating a vanishingly thin physical barrier between the conductive plates (<100 µm). The physical barrier effectively maintains charge separation when the supercapacitor is in the charged state, while being sufficiently permeable to charge carriers to allow rapid charge and discharge rates.

Many conventional supercapacitors presently use activated carbon particles as a high surface area substrate to hold charge carriers from an electrolyte dispersed therein. Although activated carbon particles have a high surface area, certain charge carriers are too large to penetrate the porous interior of the activated carbon particles and take advantage of its high surface area. FIG. 1 shows a schematic of an illustrative prior art supercapacitor 100 containing activated carbon particles 105. Supercapacitor 100 contains conductive layers 101 and 102, connected to positive terminal 103 and negative terminal 104, respectively. Conductive layers 101 and 102 each contain activated carbon particles 105 and an electrolyte containing positive ions 106 and negative ions 107 admixed with activated carbon particles 105. Positive ions 106 and negative ions 107 can reside about the interior or exterior of activated carbon particles 105. Conductive layers 101 and 102 are physically isolated from one another by a layer of separator material 108, which is permeable to positive ions 106 and negative ions 107 of the electrolyte. As shown in FIG. 1, supercapacitor 100 is in a discharged state.

Certain high performance materials, including carbon nanotubes, have been proposed as a replacement for activated carbon particles in supercapacitors due their high accessible surface area. Carbon nanotubes can be further advantageous in this regard due to their electrical conductivity. Although carbon nanotubes have significant potential for improving the performance of supercapacitors, research efforts to date have only been successful in randomly dispersing small quantities of carbon nanotubes in the electrolyte medium of a supercapacitor. As such, current fabrication techniques are only amenable to production of small carbon nanotube-containing supercapacitors with low electrical storage capabilities.

In view of the foregoing, supercapacitors containing large quantities of carbon nanotubes would be of significant benefit in the art due to their enhanced electrical storage capabilities. It would also be of considerable benefit in the art to provide methods and apparatuses for readily preparing such supercapacitors. Other electrical devices could also benefit from the facile incorporation of carbon nanotubes therein for similar reasons. The present invention satisfies these needs and provides related advantages as well.

SUMMARY

In some embodiments, electrical devices described herein include a first electrode material containing a first plurality of carbon nanotubes infused to a first substrate, and a second electrode material containing a second plurality of carbon nanotubes infused to a second substrate. The first electrode material and the second electrode material are wound in a spiral configuration about a central axis.

In some embodiments, methods described herein include providing a first electrode material containing a first plurality of carbon nanotubes infused to a first substrate, providing a second electrode material containing a second plurality of carbon nanotubes infused to a second substrate, forming a layered structure containing the first electrode material and the second electrode material, and winding the layered structure in a spiral configuration about a central axis.

In other embodiments, methods described herein include providing a first substrate of spoolable dimensions on a first payout reel and a second substrate of spoolable dimensions on a second payout reel; transporting the first substrate and the second substrate through a carbon nanotube growth reactor so as to infuse carbon nanotubes thereto, thereby forming a first electrode material containing a first plurality of carbon nanotubes infused to the first substrate and a second electrode material containing a second plurality of carbon nanotubes infused to the second substrate; forming a layered structure containing the first electrode material and the second electrode material; and winding the layered structure in a spiral configuration about a central axis.

In some embodiments, apparatuses described herein include a carbon nanotube growth reactor, a first payout reel and a second payout reel upstream of the carbon nanotube growth reactor, a third payout reel downstream of the carbon nanotube growth reactor, and a takeup reel. The first payout reel and the second payout reel are operatively coupled to the carbon nanotube growth reactor so as to continuously transport a first substrate and a second substrate through the carbon nanotube growth reactor and to infuse carbon nanotubes thereto. The third payout reel is operatively coupled to an output of the carbon nanotube growth reactor so as to form a layered structure containing the first substrate, the second substrate, and an output of the third payout reel that is disposed between the first substrate and the second substrate. The takeup reel is operable for winding the layered structure in a spiral configuration about a central axis.

The foregoing has outlined, rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiments of the disclosure, wherein.

DETAILED DESCRIPTION

Figure 1:
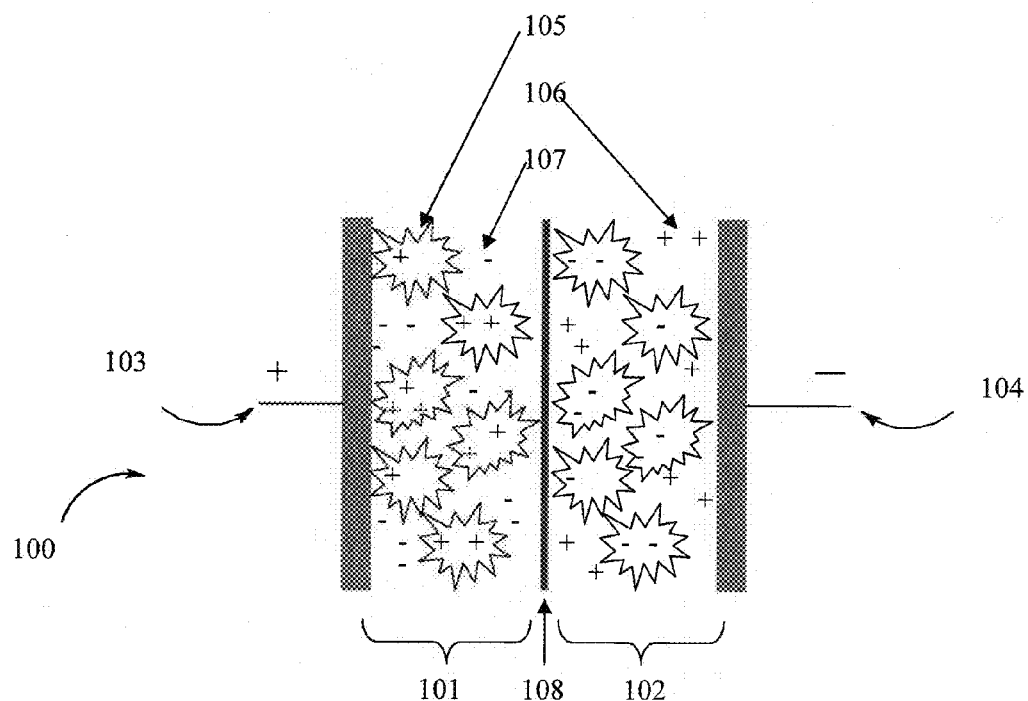
FIG. 1 shows a schematic of an illustrative prior art supercapacitor containing activated carbon particles.

The present disclosure is directed, in part, to electrical devices containing a layered structure having electrode materials formed from carbon nanotubes that are infused to a substrate (i.e., carbon nanotube-infused substrates or carbon nanotube-infused substrate materials), where the layered structure is wound in a spiral configuration about a central axis. The present disclosure is also directed, in part, to methods for making such electrical devices. In addition, the present disclosure is also directed, in part, to apparatuses for making such electrical devices.

As previously described, supercapacitors typically display much higher capacitance values than do conventional capacitors or electrolytic capacitors. Accordingly, they have garnered significant interest in energy storage applications such as, for example, solar energy collection, hydroelectric energy collection, and wind farm energy collection. The rapid charge and discharge cycles of supercapacitors make them well suited for these purposes and others, since supercapacitors can readily take on excess energy when electrical grid demand is low and quickly release their stored energy when electrical grid demand is high. Further, supercapacitors are capable of being non-degradably charged and discharged many hundreds of thousands of times, making them considerably superior to batteries in this regard. In addition, the rapid charge and discharge cycles of supercapacitors and their charge/discharge stability make them particularly well suited for applications in which multiple cycles of rapid charging and discharging are desirable such as, for example, in hybrid gas-electric vehicles.

With growing interest in the above applications and others, supercapacitors that have even higher energy storage limits than those currently available are needed. The capacitance in supercapacitors is proportional to the electrode surface area (e.g., the area of the conductive plates). In conventional supercapacitors containing activated carbon particles, there is an intrinsic limit as to how much the effective electrode surface area can be increased for an electrode of a given size. That is, the activated carbon particles used in conventional supercapacitors can only be made so small before an asymptotic capacitance value is reached. Further, limited pore sizes in the activated carbon particles reduce their effective surface area and can be problematic for some larger electrolytes. Because carbon nanotubes can provide a much higher effective surface area per unit weight than does activated carbon, these entities offer the potential to significantly increase the capacitance of supercapacitors. Despite their promise, it has heretofore been difficult to place carbon nanotubes into supercapacitors and other electrical devices in a state that can take reliably advantage of their exceedingly high effective surface area.

Embodiments of the present disclosure describe supercapacitors and other electrical devices that contain electrode materials made from carbon nanotubes infused to a substrate. Continuous processes for infusing continuous fibers with carbon nanotubes in commonly owned, co-pending U.S. patent application Ser. Nos. 12/611,073, 12/611,101, and 12/611,103, all filed on Nov. 2, 2009, and Ser. No. 12/938,328, filed on Nov. 2, 2010, each of which is incorporated herein by reference in its entirety. The fiber materials of such carbon nanotube-infused fibers can generally vary without limitation and can include, for example, glass fibers, carbon fibers, metal fibers, ceramic fibers, and organic fibers (e.g., aramid fibers). Such carbon nanotube-infused fibers can be readily prepared in spoolable lengths from commercially available continuous individual fibers or continuous fiber forms (e.g., fiber tows, tapes, films, woven and non-woven fabrics, mats, plies and ribbons). The carbon nanotubes' lengths, diameters, and coverage density on the fiber materials can easily be varied by applying the above-referenced methods. Further, these methods can be readily adapted to other continuous length, non-fibrous substrates such as, for example, sheets, foils, and films, in order to infuse carbon nanotubes thereto. Additional details concerning the carbon nanotube-infused fibers and methods for production thereof are described in greater detail hereinafter.

In the present embodiments, it will be understood that reference to a substrate or substrate material includes both fibrous and non-fibrous materials that are infused with carbon nanotubes. Although particular embodiments herein may reference commonly owned, co-pending patent applications describing carbon nanotube-infused fibers, it will be understood that any similar continuous length substrate (e.g., a fibrous or non-fibrous substrate of spoolable dimensions) can be infused with carbon nanotubes in a like manner by routine modification of the above-referenced methods.

Depending on their growth conditions, the carbon nanotubes infused to continuous fibers and like substrates can be oriented such that they are substantially perpendicular or substantially parallel to the surface of the fiber material or substrate. In the present embodiments, a higher effective electrode surface area can be realized by having the carbon nanotubes in a substantially perpendicular orientation. This is particularly true when the carbon nanotubes are present in a substantially unbundled state, so as to allow full exposure to their exterior surface. The above-referenced methods for preparing carbon nanotube-infused fibers and like substrates are particularly adept at achieving a substantially perpendicular carbon nanotube orientation in a substantially unbundled state, thereby providing carbon nanotube-infused fibers and like substrates having a high effective surface area for use as electrode materials in the present embodiments. However, any orientation of carbon nanotubes on the substrate, including a substantially parallel orientation with respect to the substrate surface, can be used in the present embodiments while still residing within the spirit and scope of the present disclosure.

Not only do carbon nanotubes replace activated carbon particles in the present supercapacitor embodiments, but the carbon nanotubes become essentially indistinct from the electrode itself. In conventional supercapacitors containing activated carbon particles, there are electrode plates that are in contact with the activated carbon particles (see FIG. 1). However, the activated carbon particles are not infused to the electrode plates in conventional supercapacitors. In the present embodiments, the carbon nanotubes are strongly infused to a substrate, thereby making the carbon nanotubes indistinct from the electrodes themselves. This feature represents a new paradigm in the design of supercapacitors and other electrical devices.

Figure 2:
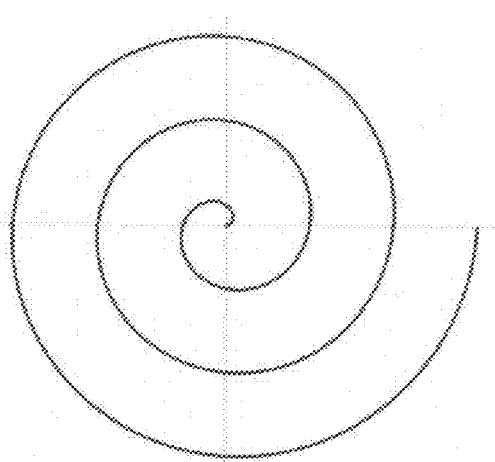
FIG. 2 shows an illustrative two-dimensional Archimedean spiral, showing substantially regular spacing between adjacent arms of the spiral.

Further, the present electrical devices have a layered structure containing a first electrode material and a second electrode material, each containing a substrate and a plurality of carbon nanotubes infused thereto, that is wound into a spiral configuration (e.g., an Archimedean spiral or similar spiral structure) in the electrical devices. In some embodiments, the spiral configuration of the layered structure is wound about a central axis such that there is substantially regular spacing between adjacent arms of the spiral, such as that seen in an Archimedean spiral. FIG. 2 shows an illustrative two-dimensional Archimedean spiral, showing substantially regular spacing between adjacent arms of the spiral. As described hereinafter, substantially regular spacing between adjacent layers of electrode material in the spiral configuration can be provided by an intervening layer such as, for example, a layer of insulator material or a layer of separator material.

The spiral configuration of the present embodiments also advantageously allows electrode materials having very large effective surface areas to be packed into electrical devices having minimal volumes. Depending on factors including, for example, the lengths, diameters, and coverage density of carbon nanotubes on the substrate materials, electrode materials can be produced having effective surface areas that are much larger than those conventionally achievable with activated carbon particles. As previously noted, all of these parameters are readily varied in the above-described methods for producing carbon nanotube-infused fibers. Accordingly, these parameters can be used to tune the electrical properties of the present electrical devices.

As used herein, the term "spiral configuration" refers to a non-helical layered structure wound about a central axis. In various embodiments, the spiral configuration of the present electrical devices can approximate that of an Archimedean spiral extended into three dimensions. Winding about the central axis can be conducted in a clockwise or counterclockwise fashion.

As used herein, the terms "substrate" or "substrate material" refer to any substance that can have carbon nanotubes infused thereto, and the term "continuous substrate" refers to a substrate of spoolable length.

As used herein, the terms "fiber," "fiber material," or "filament" equivalently refer to a substrate that has a fibrous component as a basic structural feature. As used herein, the term "continuous fibers" refers to spoolable lengths of fibers such as individual filaments, yarns, rovings, tows, tapes, ribbons, woven and non-woven fabrics (e.g., fiber sheets), plies, mats, and the like.

As used herein, the terms "spoolable lengths" or "spoolable dimensions" equivalently refer to a substrate that has at least one dimension that is not limited in length, thereby allowing the substrate to be stored on a spool or mandrel before or after infusion with carbon nanotubes. A substrate of spoolable lengths or spoolable dimensions has at least one dimension that indicates the use of either batch or continuous processing for carbon nanotube infusion thereto.

As used herein, the term "infused" refers to being bonded, and the term "infusion" refers to the process of bonding. Hence, the term "carbon nanotube-infused substrate" refers to a substrate that has carbon nanotubes bonded thereto. Further, the term "carbon nanotube-infused fiber" refers to a fiber material that has carbon nanotubes bonded thereto. Such bonding of carbon nanotubes to a substrate or fiber material can involve mechanical attachment, covalent bonding, ionic bonding, pi-pi interactions (pi-stacking interactions), and/or van der Waals force-mediated physisorption. In some embodiments, the carbon nanotubes can be directly bonded to the substrate or fiber material. In other embodiments, the carbon nanotubes can be indirectly bonded to the substrate or fiber material via a barrier coating and/or catalytic nanoparticles used to mediate growth of the carbon nanotubes. The particular manner in which the carbon nanotubes are infused to the substrate or fiber material can be referred to as the bonding motif.

As used herein, the term "nanoparticle" refers to particles having a diameter between about 0.1 nm and about 100 nm in equivalent spherical diameter, although nanoparticles need not necessarily be spherical in shape. As used herein, the term "catalytic nanoparticle" refers to a nanoparticle that possesses catalytic activity for mediating carbon nanotube growth.

As used herein, the term "transition metal" refers to any element or alloy of elements in the d-block of the periodic table (Groups 3 through 12), and the term "transition metal salt" refers to any transition metal compound such as, for example, transition metal oxides, carbides, nitrides, and the like. Illustrative transition metals that form catalytic nanoparticles suitable for synthesizing carbon nanotubes include, for example, Ni, Fe, Co, Mo, Cu, Pt, Au, Ag, alloys thereof, salts thereof, and mixtures thereof.

As used herein, the terms "sizing agent" or "sizing" collectively refer to materials used in the manufacture of fiber materials as a coating to protect the integrity of the fiber material, to provide enhanced interfacial interactions between the fiber material and a matrix material, and/or to alter and/or to enhance certain physical properties of the fiber material.

As used herein, the term "uniform in length" refers to a condition in which carbon nanotubes have lengths with tolerances of plus or minus about 20% or less of the total carbon nanotube length, for carbon nanotube lengths ranging from about 1 μm to about 500 μm. At very short carbon nanotube lengths (e.g., about 1 μm to about 4 μm), the tolerance can be plus or minus about 1 μm, that is, somewhat more than about 20% of the total carbon nanotube length.

As used herein, the term "uniform in density distribution" refers to a condition in which the carbon nanotube coverage density on a substrate or fiber material has a tolerance of plus or minus about 10% over the substrate or fiber material surface area that is covered with carbon nanotubes.

As used herein, the term "continuous process" refers to a multi-stage process that operates in a substantially uninterrupted manner.

In some embodiments, electrical devices described herein include a first electrode material containing a first plurality of carbon nanotubes infused to a first substrate, and a second electrode material containing a second plurality of carbon nanotubes infused to a second substrate. The first electrode material and the second electrode material are wound in a spiral configuration about a central axis. Various embodiments of the electrical devices are shown in FIGS. 3A-3H, 4A and 4B, which are discussed in more detail hereinbelow.

In some embodiments, the electrical devices form a supercapacitor. In such embodiments, the electrical devices further include an electrolyte in contact with the first electrode material and the second electrode material, and a first separator material that is permeable to ions of the electrolyte and disposed between the first electrode material and the second electrode material.

The types of carbon nanotubes infused to the substrates in the present embodiments can generally vary without limitation. In various embodiments, the carbon nanotubes infused to the substrate can be, for example, any of a number of cylindrically-shaped carbon allotropes of the fullerene family including single-wall carbon nanotubes, double-wall carbon nanotubes, multi-wall carbon nanotubes, and any combination thereof. In some embodiments, the carbon nanotubes can be capped with a fullerene-like structure. Stated another way, the carbon nanotubes have closed ends in such embodiments. However, in other embodiments, the carbon nanotubes can remain open-ended. In some embodiments, closed carbon nanotube ends can be opened through treatment with an appropriate oxidizing agent (e.g., $HNO_3/H_2SO_4$). In some embodiments, the carbon nanotubes can encapsulate other materials (e.g., metal nanoparticles). In some embodiments, the carbon nanotubes can be covalently functionalized after becoming infused to the substrate. In some embodiments, a plasma process can be used to promote functionalization of the carbon nanotubes.

Carbon nanotubes can be metallic, semimetallic or semiconducting depending on their chirality. An established system of nomenclature for designating a carbon nanotube's chirality is recognized by those of ordinary skill in the art and is distinguished by a double index (n,m), where n and m are integers that describe the cut and wrapping of hexagonal graphite when formed into a tubular structure. In addition to chirality, a carbon nanotube's diameter also influences its electrical conductivity and the related property of thermal conductivity. In the synthesis of carbon nanotubes, the carbon nanotubes' diameters can be controlled by using catalytic nanoparticles of a given size. Typically, a carbon nanotube's diameter is approximately that of the catalytic nanoparticle that catalyzes its formation. Therefore, carbon nanotubes' properties can be controlled in one respect by adjusting the size of the catalytic nanoparticles used in their synthesis, for example. By way of non-limiting example, catalytic nanoparticles having a diameter of about 1 nm can be used to infuse a substrate with single-wall carbon nanotubes. Larger catalytic nanoparticles can be used to prepare predominantly multi-wall carbon nanotubes, which have larger diameters because of their multiple nanotube layers, or mixtures of single-wall and multi-wall carbon nanotubes. Multi-wall carbon nanotubes typically have a more complex conductivity profile than do single-wall carbon nanotubes due to interwall reactions that can occur between the individual nanotube layers and redistribute current non-uniformly. By contrast, there is no change in current across different portions of a single-wall carbon nanotube.

In general, the carbon nanotubes infused to the substrates in the present embodiments can be of any length. Longer carbon nanotubes are generally more advantageous in the present embodiments, since they can provide electrode materials having higher effective surface areas. In various embodiments, the carbon nanotubes can have a length ranging between about 1 μm and about 1000 μm or between about 1 μm and about 500 μm. In some embodiments, the carbon nanotubes can have a length ranging between about 100 μm and about 500 μm. In other embodiments, the carbon nanotubes can have a length ranging between about 1 μm and about 50 μm or between about 10 μm and about 25 μm. In some embodiments, the carbon nanotubes can be substantially uniform in length.

In some embodiments, an average length of the carbon nanotubes ranges between about 1 μm and about 500 μm, including about 1 μm, about 2 μm, about 3 μm, about 4 μm, about 5 μm, about 6 μm, about 7 μm, about 8 μm, about 9 μm, about 10 μm, about 15 μm, about 20 μm, about 25 μm, about 30 μm, about 35 μm, about 40 μm, about 45 μm, about 50 μm, about 60 μm, about 70 μm, about 80 μm, about 90 μm, about 100 μm, about 150 μm, about 200 μm, about 250 μm, about 300 μm, about 350 μm, about 400 μm, about 450 μm, about 500 μm, and all values and subranges therebetween. In some embodiments, an average length of the carbon nanotubes is less than about 1 μm, including about 0.5 μm, for example, and all values and subranges therebetween. In some embodiments, an average length of the carbon nanotubes ranges between about 1 μm and about 10 μm, including, for example, about 1 μm, about 2 μm, about 3 m, about 4 μm, about 5 μm, about 6 µm, about 7 µm, about 8 µm, about 9 µm, about 10 µm, and all values and subranges therebetween. In still other embodiments, an average length of the carbon nanotubes is greater than about 500 µm, including, for example, about 510 µm, about 520 µm, about 550 µm, about 600 µm, about 700 µm, and all values and subranges therebetween.

The average length of the carbon nanotubes can be one factor that determines the weight percentage of carbon nanotubes infused to the substrate in the present embodiments. In general, the carbon nanotube-infused fibers described in the above-referenced co-pending patent applications have much higher carbon nanotube loading percentages than can be obtained by other methods. For example, carbon nanotube-infused fibers can contain between about 1% to about 30% or even about 40% to 50% infused carbon nanotubes by weight. The weight percentage of carbon nanotubes infused to a substrate can vary over a comparable range in the present embodiments. The chosen carbon nanotube weight percentage can be dictated by the desired capacitance in the present supercapacitor embodiments. Further, the infused carbon nanotubes are much more strongly bonded to the substrates in the present embodiments than would be obtained by simple deposition of preformed carbon nanotubes thereon.

The carbon nanotube coverage density on the substrate can be another factor that determines the weight percentage of infused carbon nanotubes. In some embodiments, the carbon nanotubes infused to the substrate are generally uniform in density distribution, referring to the uniformity of the carbon nanotube density that is infused to the substrate. As defined above, the tolerance for a uniform density distribution is plus or minus about 10% over the substrate surface area that is infused with carbon nanotubes. By way of non-limiting example in a fiber material, this tolerance is equivalent to about ±1500 carbon nanotubes/$\mu m^2$ for a carbon nanotube having a diameter of 8 nm and 5 walls. Such a figure assumes that the space inside the carbon nanotube is fillable. In some embodiments of a carbon nanotube-infused fiber material, the maximum carbon nanotube density, expressed as a percent coverage of the fiber material (i.e., the percentage of the fiber material surface area that is covered with carbon nanotubes) can be as high as about 55%, again assuming a carbon nanotube having an 8 nm diameter, 5 walls and fillable space within. 55% surface area coverage is equivalent to about 15,000 carbon nanotubes/$\mu m^2$ for a carbon nanotube having the referenced dimensions. In some embodiments, the density of coverage is up to about 15,000 carbon nanotubes/$\mu m^2$. One of ordinary skill in the art will recognize that a wide range of carbon nanotube density distributions can be attained by varying the disposition of the catalytic nanoparticles on the surface of the substrate, the exposure time of the substrate to carbon nanotube growth conditions, and the actual growth conditions themselves used to infuse the carbon nanotubes to the substrate.

In some embodiments, the density of carbon nanotube coverage on the substrate can be adjusted to account for a change in ion size. For example, if the electrolyte of a supercapacitor contains larger ions, a lower density of carbon nanotube coverage on the substrate can be used to ensure satisfactory ion mobility and electrode contact during charge and discharge cycles of the supercapacitor.

Figure 3A:
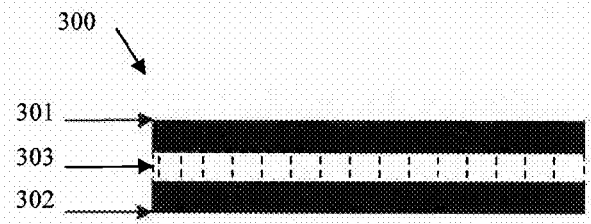
FIG. 3A shows a schematic of an illustrative layered structure of some embodiments of the present electrical devices.
Figure 3B:
FIG. 3B shows a schematic of an illustrative electrical device containing the layered structure of FIG. 3A wound into a spiral configuration about a central axis.
Figure 3C:
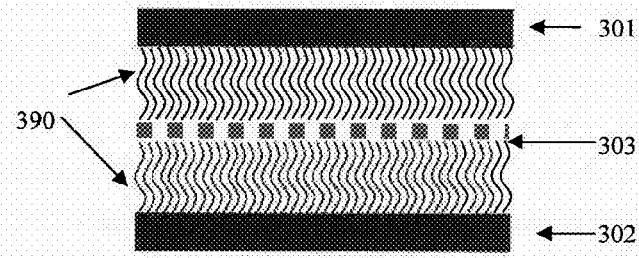
FIG. 3C shows a schematic of the layered structure of FIG. 3A illustrating the infused carbon nanotubes.

In accordance with the present embodiments, carbon nanotube-infused substrates form the electrode materials of an electrical device. The carbon nanotube-infused substrates are present in a layered structure, which is subsequently wound in a spiral configuration about a central axis of the electrical device. Further, in embodiments in which the electrical device is a supercapacitor, a separator material that is permeable to ions of an electrolyte is disposed between the electrode materials in the layered structure to provide charge separation therebetween. FIG. 3A shows a schematic of an illustrative layered structure of some embodiments of the present electrical devices, and FIG. 3B shows a schematic of an illustrative electrical device containing the layered structure of FIG. 3A wound into a spiral configuration about a central axis. FIG. 3C shows a schematic of the layered structure of FIG. 3A illustrating the infused carbon nanotubes 390. FIG. 3A shows layered structure 300 containing first electrode material 301 and second electrode material 302. First and second electrode materials 301 and 302 are formed from substrates that are infused with carbon nanotubes. Between first electrode material 301 and second electrode material 302 is disposed a first separator material 303. FIG. 3B shows the winding of layered structure 300 into spiral configuration 310 about central axis 311. Although FIG. 3B has depicted a counterclockwise winding of spiral configuration 310, the spiral configuration can be equivalently wound in a clockwise fashion such that the relative positions of first electrode material 301 and second electrode material 302 are reversed. Note that the schematic of FIG. 3B is viewed along the central axis of the electrical device, and the actual electrical device structure resembles that of a cylinder having an internal structure wound in the depicted spiral configuration. Although FIG. 3B has depicted spacing between adjacent layers of first electrode material 301 and second electrode material 302 in spiral configuration 310, there can be any desired spacing therebetween. Generally, to produce the highest capacitance per unit volume, the spacing between adjacent layers in spiral configuration 310 is kept as small as possible.

Figure 3D:
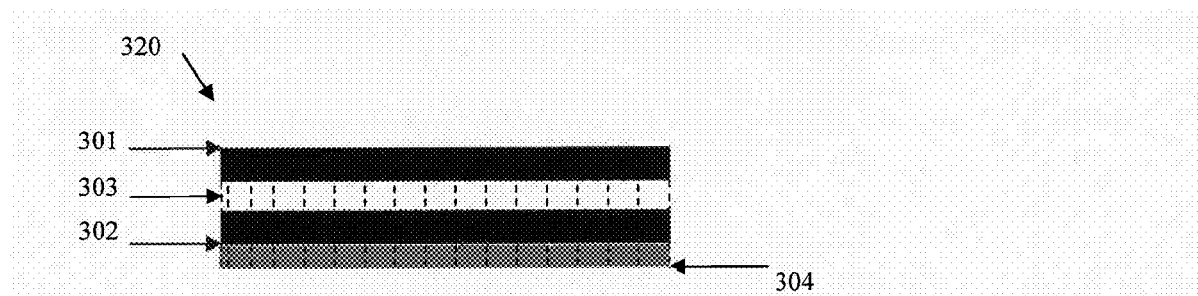
FIG. 3D shows a schematic of an illustrative layered structure of some embodiments of the present electrical devices containing an insulator material.
Figure 3E:
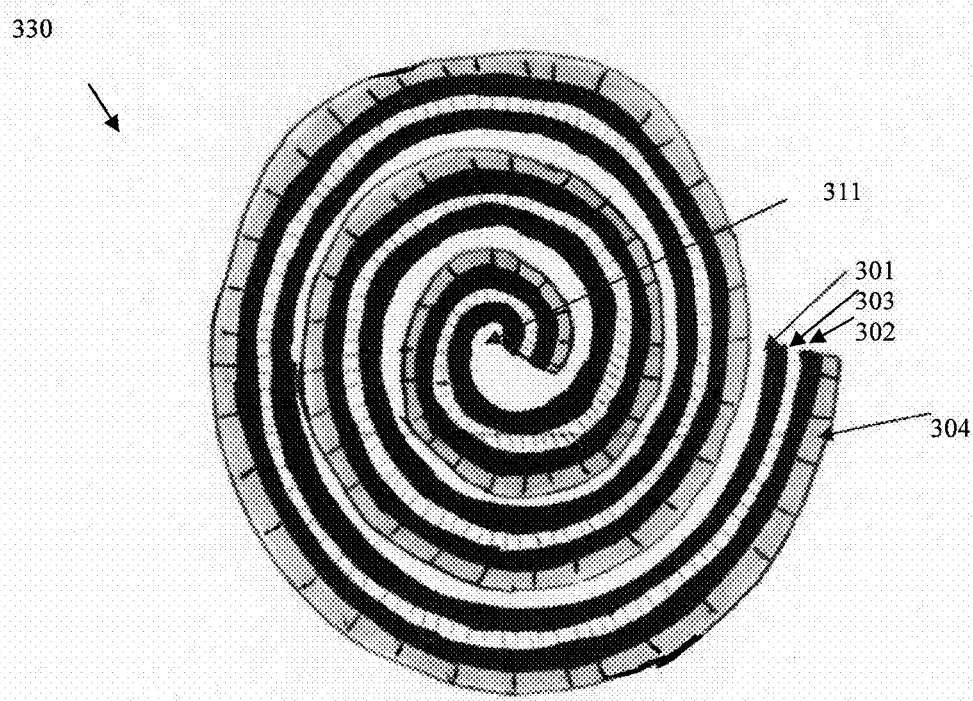
FIG. 3E shows a schematic of an illustrative electrical device containing the layered structure of FIG. 3D wound into a spiral configuration about a central axis.

In order to prevent shorting between the adjacent layers in spiral configuration 310, the present electrical devices further provide for electrical isolation therebetween. In some embodiments, electrical isolation can be provided by an insulator material disposed between the adjacent layers. In some embodiments, the present electrical devices further include an insulator material that is not adjacent to the first separator material. FIG. 3D shows a schematic of an illustrative layered structure of some embodiments of the present electrical devices containing an insulator material, and FIG. 3E shows a schematic of an illustrative electrical device containing the layered structure of FIG. 3D wound into a spiral configuration about a central axis. FIG. 3D shows a schematic of layered structure 320, similar to that previously described for FIG. 3A, where insulator material 304 is placed adjacent to second electrode material 302. FIG. 3E shows the winding of layered structure 320 into spiral configuration 330 about central axis 311. Similar to FIG. 3B, spiral configuration 330 of FIG. 3E has been depicted with a counterclockwise winding. Spiral configuration 330 can be equivalently wound in a clockwise fashion by simply placing insulator material 304 adjacent to first electrode material 301 in layered structure 320 prior to clockwise winding. Again, FIG. 3E, as depicted, shows some spacing between adjacent layers in spiral configuration 330. That is, insulator material 304 and first electrode material 301 can be spaced apart, if desired. However, in other embodiments, insulator material 304 and the first electrode material 301 can touch in order to achieve optimal use of space. In embodiments where insulator material 304 and first electrode material 301 are spaced apart, excess electrolyte can fill the space therebetween. In some embodiments, the spacing between adjacent layers in spiral configuration 330 can be varied, if needed, to provide a desired capacitance in a supercapacitor of a given size.

Figure 3F:
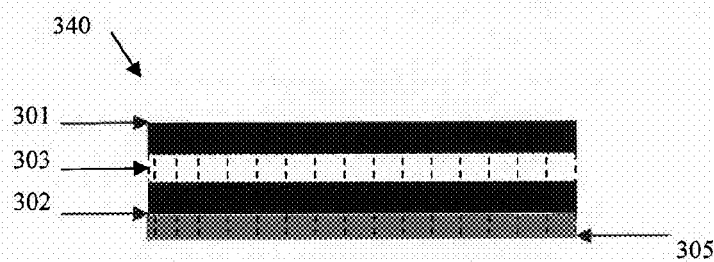
FIG. 3F shows a schematic of an illustrative layered structure of some embodiments of the present electrical devices containing a second separator material.
Figure 3G:
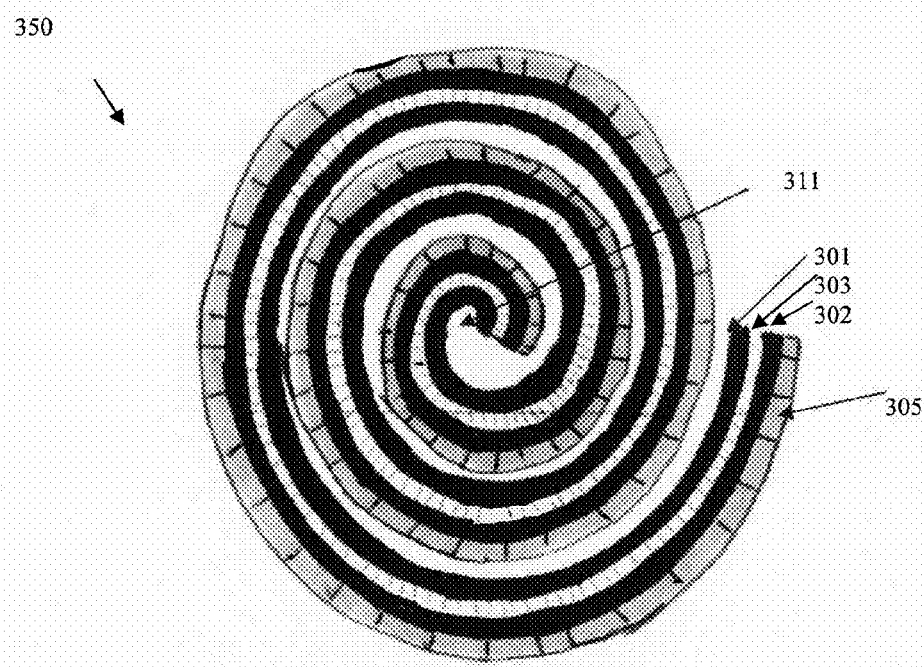
FIG. 3G shows a schematic of an illustrative electrical device containing the layered structure of FIG. 3F wound into a spiral configuration about a central axis.

In alternative embodiments, electrical isolation can be provided by a second separator material disposed between the first electrode material and the second electrode material. In some embodiments, the present electrical devices further include a second separator material that is not adjacent to the first separator material. FIG. 3F shows a schematic of an illustrative layered structure of some embodiments of the present electrical devices containing a second separator material, and FIG. 3G shows a schematic of an illustrative electrical device containing the layered structure of FIG. 3F wound into a spiral configuration about a central axis. FIG. 3F shows a schematic of layered structure 340, similar to that previously described for FIG. 3A, where second separator material 305 is placed adjacent to second electrode material 302. FIG. 3G shows the winding of the layered structure 340 into spiral configuration 350 about central axis 311. Again, winding, in spiral configuration 350 can be changed from a counterclockwise fashion to a clockwise fashion by placing second separator material 305 adjacent to first electrode material 301 in layered structure 340. Further, any desired spacing between second separator material 305 and first electrode material 301 can be used in the present embodiments, as previously described.

In the embodiments depicted in FIGS. 3E and 3G, an electrolyte (not shown) can be associated with first electrode material 301 and second electrode material 302 in an electrical device containing spiral configurations 330 and 350. As noted previously, carbon nanotubes infused on the substrates of first electrode material 301 and second electrode material 302 can convey large effective surface areas to the electrode materials for association with the electrolyte.

Figure 3H:
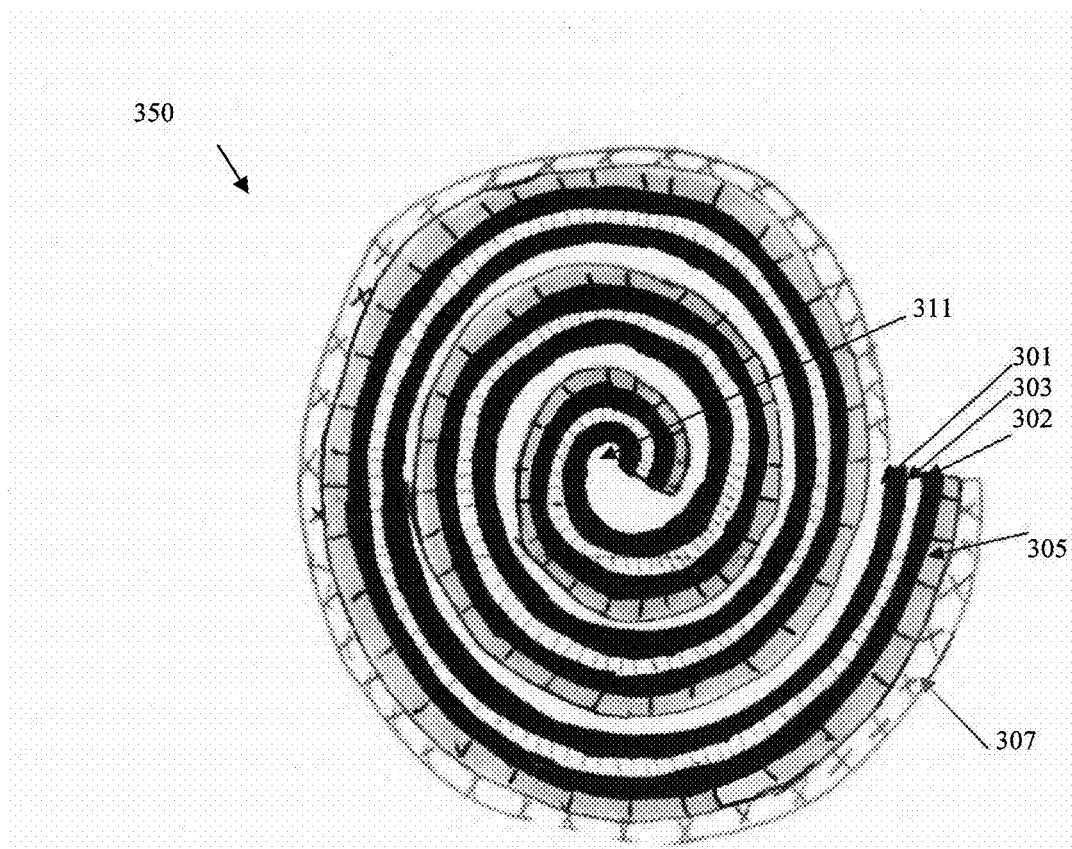
FIG. 3H shows a schematic of the electrical device of FIG. 3G in which the outermost surface of the spiral configuration is coated with insulator material.

In some embodiments, the present electrical devices can further include an insulator material over the outermost surface of the spiral configuration. Particularly in embodiments containing a second separator material, an insulator material over the outermost surface of the spiral configuration can be used to electrically isolate the electrical device from its surrounding environment. Further, an insulator material over the outermost surface of the spiral configuration of the electrical device can aid in containing the electrolyte therein. FIG. 3H shows a schematic of the electrical device of FIG. 3G in which the outermost surface of spiral configuration 350 is coated with insulator material 307 over second separator material 305. In FIG. 3H, first electrode material 301 and second electrode material 302 can extend through insulator material 307 to be connected to electrode terminals (not shown) to be used for charging or discharging the electrical device. In some embodiments, the present electrical devices can further include a first electrode terminal connected to the first electrode material and a second electrode terminal connected to the second electrode material.

Figure 4A:
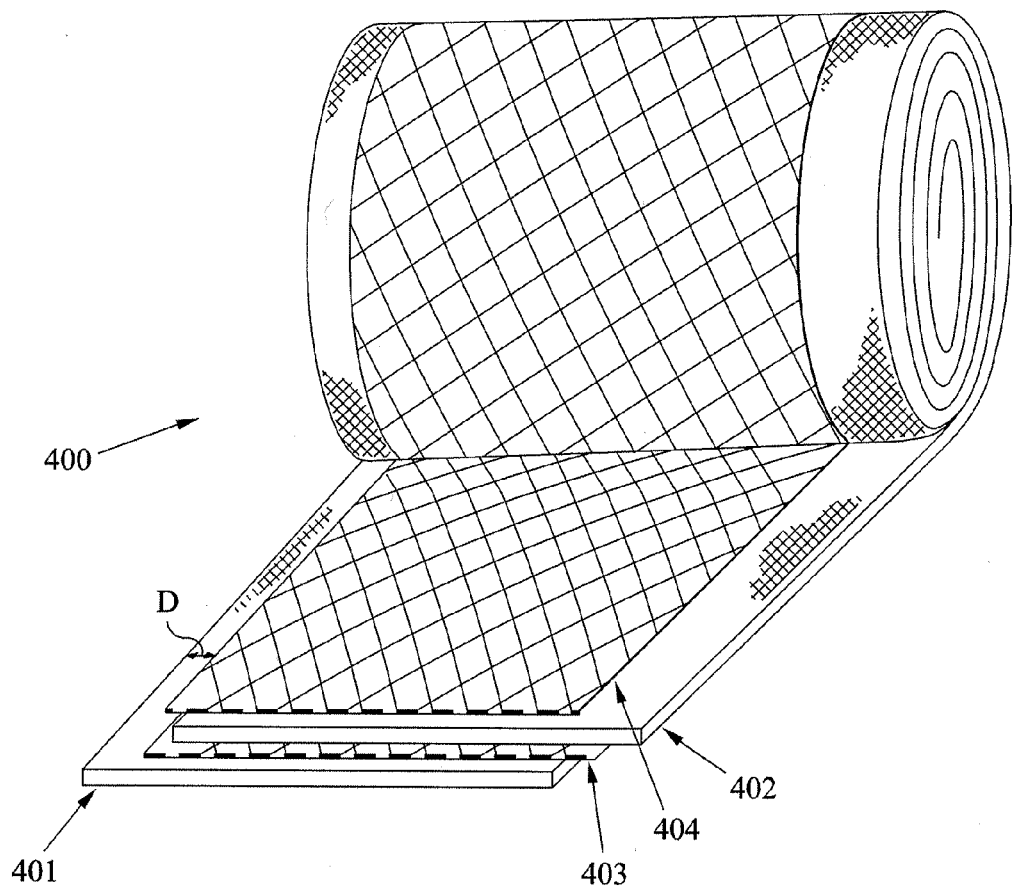
FIG. 4A shows a schematic of an illustrative, partially unwound spiral configuration in which an edge of the first electrode material and an edge of the second electrode material are offset from one another.

Electrical isolation in the present electrical devices can still be maintained even in embodiments in which an insulator material is not present. In some embodiments, electrical isolation can be maintained by offsetting the first electrode material and the second electrode material. In some embodiments, the present electrical devices can have an edge of the first electrode material and the second electrode material offset from one another before being wound in the spiral configuration. FIG. 4A shows a schematic of an illustrative, partially unwound spiral configuration (analogous to that of FIG. 3G) in which an edge of the first electrode material and an edge of the second electrode material are offset from one another. As shown in FIG. 4A, the left and right edges of first electrode material 401 and second electrode material 402 of spiral configuration 400 are offset from another by a distance, D. First separator material 403 is disposed between first electrode material 401 and second electrode material 402 in the overlap region therebetween. Likewise, second separator material 404 lies over second electrode material 402 such that it too lies over the overlap region. When placed in a housing, this spiral orientation allows the two electrode materials to be addressed independently of one another, as shown in FIG. 4B.

Figure 4B:
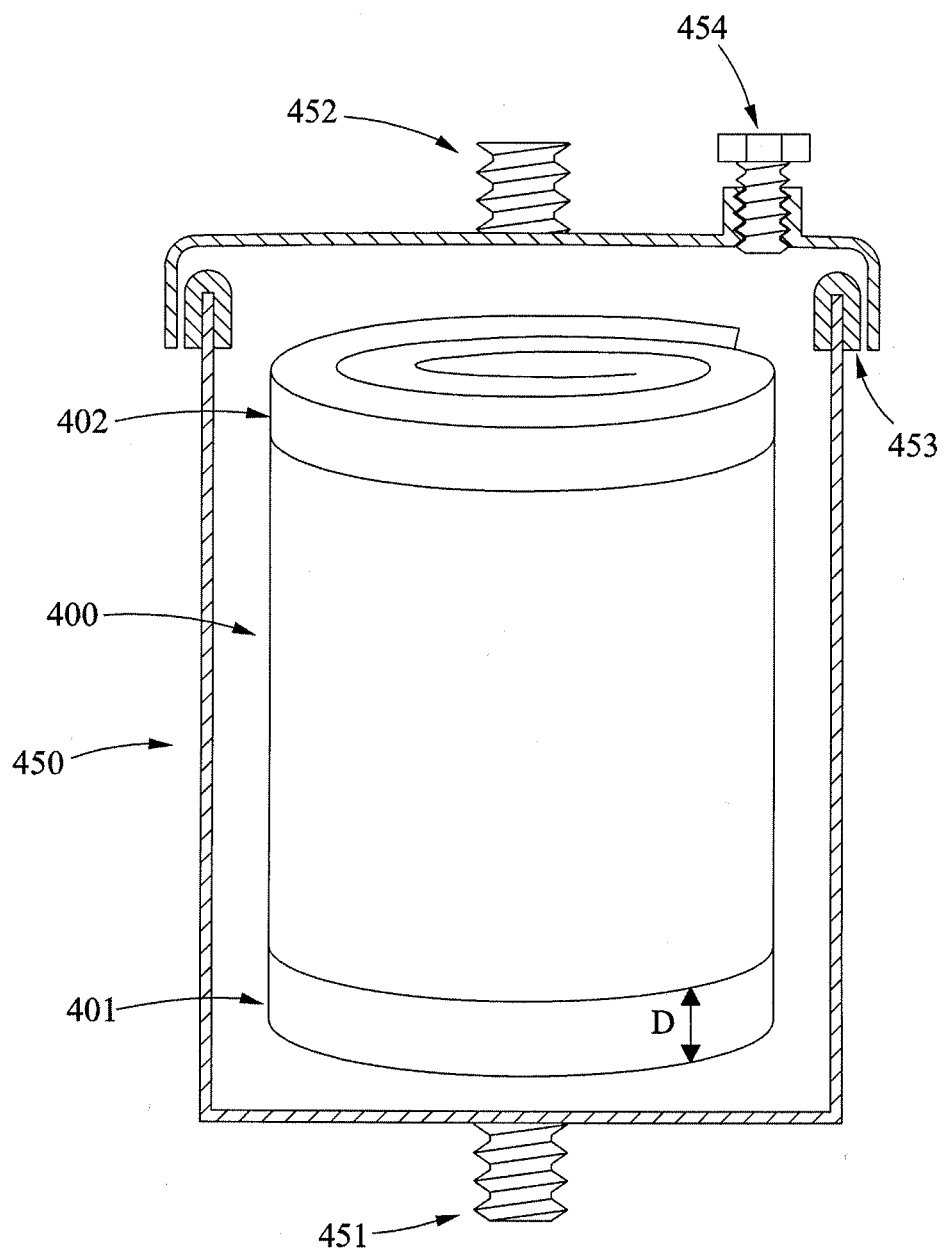
FIG. 4B shows a schematic in which the spiral configuration of FIG. 4A is placed in an illustrative housing.

FIG. 4B shows a schematic in which spiral configuration 400 is placed in illustrative housing 450. First electrode material 401 and second electrode material 402, offset from one another by distance, D, are oriented such that they are independently electrically addressed by first electrode terminal 451 and second electrode terminal 452, respectively. In an embodiment, first electrode material 401 is the anode and first electrode terminal 451 is positively charged, and second electrode material 402 is the cathode and second electrode terminal 452 is negatively charged. In FIG. 4B, first electrode terminal 451 and second electrode terminal 452 are electrically isolated from one another by insulating seal 453. Optional fill plug 454 is included to add electrolyte to housing 450. As drawn, FIG. 4B does not show the electrolyte, but a level of the electrolyte in housing 450 is generally below the level above which second electrode material 402 is exposed (e.g., distance D from the top of spiral configuration 400).

As previously described, it has been shown that continuous fibers such as, for example, glass fibers, carbon fibers, metal fibers, ceramic fibers, and organic fibers can be successfully infused with carbon nanotubes. Like non-fibrous substrates can be infused with carbon nanotubes for use in the present embodiments. In general, any type of substrate that can be successfully infused with carbon nanotubes can be used in the present embodiments. Additional details concerning carbon nanotube-infused substrates, particularly carbon nanotube-infused fibers, and methods for their production are set forth hereinbelow.

In some of the present embodiments, the first substrate and the second substrate can be a plurality of continuous fibers. When the substrate is a fiber material, the form of the fiber material can generally vary without limitation. In various embodiments, individual continuous fibers (i.e., individual filaments) have a diameter ranging between about 1 μm and about 100 μm. Continuous length fiber materials having diameters in this range are readily available from a variety of commercial sources. In some embodiments, the continuous fibers for use in the present embodiments are carbon fibers and/or metal fibers, for example.

In some embodiments, the carbon nanotubes are substantially perpendicular to the surface of the substrate to which they are infused. Although carbon nanotube-infused substrates can be produced in accordance with the methods referenced above such that the infused carbon nanotubes are present in any desired orientation, one of ordinary skill in the art will recognize that a substantially perpendicular orientation will maximize the carbon nanotube surface area and, hence, the surface area of the electrode materials. For at least this reason, a substantially perpendicular orientation of the carbon nanotubes is advantageous in the present embodiments.

In some embodiments, the first substrate and the second substrate can be electrically conductive before being infused with carbon nanotubes. In general, the substrates are sufficiently flexible so as to facilitate being wound into a spiral configuration in the present embodiments. Illustrative conductive substrates include, for example, carbon fibers, graphite, and metal sheets, films, foils, or metal fibers (e.g., stainless steel, aluminum, copper and the like). Although carbon nanotube infusion to the substrates imparts electrical conductivity thereto, better current collection and charge storage properties are generally observed when the substrates are initially electrically conductive prior to carbon nanotube infusion. In some embodiments, the first substrate and the second substrate can be in a form such as, for example, a metal sheet, a metal foil, a metal film, a graphite sheet, a graphite film, a woven sheet of continuous fibers, a non-woven sheet of continuous fibers, a ply of continuous fibers, a mat of continuous fibers, a ribbon of continuous fibers, or a tape of continuous fibers. In alternative embodiments, the substrate can be non-conductive before being infused with carbon nanotubes.

When the substrates of the present embodiments are formed from continuous fiber materials, the continuous fibers are typically used in a higher order fiber form in the present electrical devices, rather than being placed therein as individual filaments. Such higher order fiber forms vary widely in structure and are considered in further detail immediately hereinafter. In some embodiments, the fiber form of the continuous fibers can be, for example, a fiber tow, a fiber tape, a fiber ribbon, a fiber roving, a yarn, a fiber braid, a woven or non-woven fabric sheet, a fiber ply, and/or a fiber mat. In some embodiments, the individual filaments are substantially parallel to one another in the higher order fiber form. In some embodiments, some of the individual filaments are substantially parallel to one another in the higher order fiber form, and some of the individual filaments are substantially perpendicular to one another. That is, the individual filaments can form a fiber ply in such embodiments.

Rovings include soft strands of continuous fiber that have been twisted, attenuated and freed of foreign matter.

Fiber tows are generally compactly associated bundles of continuous fibers, which can be twisted together to give yarns in some embodiments. Yarns include closely associated bundles of twisted fibers, wherein each fiber diameter in the yarn is relatively uniform. Yarns have varying weights described by their 'tex,' (expressed as weight in grams per 1000 linear meters), or 'denier' (expressed as weight in pounds per 10,000 yards). For yarns, a typical tex range is usually between about 200 and about 2000.

Fiber braids are rope-like structures of densely packed continuous fibers. Such rope-like structures can be assembled from yarns, for example. Braided structures can optionally include a hollow portion. Alternately, a braided structure can be assembled about another core material.

Fiber tows can also include associated bundles of untwisted continuous fibers. Thus, fiber tows are a convenient form for manipulating large quantities of substantially parallel fibers in a single operation. As in yarns, the individual fiber diameters in a fiber tow are generally uniform. Fiber tows also have varying weights and a tex range that is usually between about 200 and 2000. In addition, fiber tows are frequently characterized by the number of thousands of individual fibers in the fiber tow, such as, for example, a 12K tow, a 24K tow, a 48K tow, and the like.

Tapes and ribbons contain continuous fibers that can be assembled as weaves or as non-woven flattened fiber tows, for example. Tapes can vary in width and are generally two-sided structures similar to a ribbon. As described in the above-referenced co-pending patent applications, carbon nanotubes can be infused to a tape on one or both sides of the tape. Further, carbon nanotubes of different types, diameters or lengths can be grown on each side of a tape.

In some embodiments, the continuous fibers can be organized into fabric or sheet-like structures. These include, for example, woven fabrics, non-woven fabrics, non-woven fiber mats and fiber plies, in addition to the tapes described above. Such higher ordered structures can be assembled from parent continuous fibers, fiber tows, yarns, or the like.

Insulator materials used in the present embodiments can generally vary without limitation. Insulator materials used for electrically isolating the electrode materials within the interior of the spiral configuration of the electrical devices are generally a pliable material that is sufficiently flexible to be wound into the spiral configuration. Illustrative insulator materials for this purpose include, for example, thin plastic sheets (e.g., thermoplastic or elastomeric polymer materials). Insulator material coating the outermost surface of the spiral configuration can likewise be formed from thin plastic sheets such as, for example, plastic shrink wrap. However, insulator material coating the outermost surface of the spiral configuration can be applied after formation of the spiral structure is completed. As such, the insulator material coating the outermost surface of the spiral configuration in the present electrical devices need not necessarily be flexible and can include materials such as, for example, thermosetting polymers (e.g., epoxies), wax, glass and ceramics, in addition to plastics. When present, the insulator material coating the outermost surface of the spiral configuration of the electrical devices can be applied by a variety of techniques including, for example, shrink wrapping, dip coating, and sol-gel processes.

The separator material of the present embodiments can be formed from any substance of sufficient thickness that is capable of maintaining charge separation of the electrolyte ions once a charged state is attained. In general, the separator material is a thin film dielectric substance that is porous in nature and allows for high ion mobility between the electrode materials when the electrical device is charging or discharging, but is capable of maintaining, charge separation once the electrical device reaches a charged state. Thus, the separator material is selectively permeable to charge carriers of an electrolyte. In some embodiments, the separator material can be a non-woven polymer fabric such as, for example, polyethylene non-woven fabrics, polypropylene non-woven fabrics, polyester non-woven fabrics, and polyacrylonitrile non-woven fabrics. In other embodiments, the separator material can be a porous substance such as, for example, a porous poly(vinylidene fluoride)-hexafluoropropane copolymer film, a porous cellulose film, kraft paper, rayon woven fabrics, and the like. Generally, any separator material that can be used in batteries can also be used in the present embodiments for a like purpose.

The degree of porosity of the separator material is such that the ions of the electrolyte are sufficiently mobile so as to move across the separator material when the supercapacitor is being charged or discharged but sufficiently immobile so as to maintain charge separation once the supercapacitor reaches a charged state. In some embodiments, the porosity of the separator material is greater than about 90%. In some embodiments, the porosity of the separator material ranges between about 90% and about 95%. In other embodiments, the porosity of the separator material ranges between about 90% and about 40%, or between about 87% and about 50%, or between about 85% and about 65%.

In addition to porosity, the thickness of the separator material can govern the degree of ion mobility across the separator material. For a given porosity, a thicker separator material provides a greater degree of charge separation and lower ion mobility than does a thinner separator material. In some embodiments, the thickness of the separator material is less than about 100 µm. In some embodiments, the thickness of the separator material ranges between about 100 µm and about 50 µm. In some embodiments, the thickness of the separator material ranges between about 50 µm and about 25 µm or between about 25 µm and about 10 µm. In some embodiments, the thickness of the separator material is less than about 10 µm. In some embodiments, the thickness of the separator material ranges between about 10 µm and about 1

µm. In some embodiments, the thickness of separator material is less than about 1 µm. In some embodiments, the thickness of the separator material ranges between about 100 nm and about 1 µm. When both a first separator material and a second separator material are present in the current embodiments, the thickness of the second separator material can be the same as or different than the first separator material. In some embodiments, a thickness of the separator material can be optimized to achieve a balance between electrolyte volume and voltage standoff capability.

In one embodiment, a suitable separator material can be a high porosity (e.g., >90%) polypropylene and/or polyethylene electrolytic membrane. Such electrolytic membranes are available from Celgard LLC of Charlotte, N.C. These electrolytic membranes exhibit a high electric voltage standoff capability, thereby permitting a thinner and lighter film for isolating the electrode materials. In some embodiments, a paper separator material (e.g., kraft paper) can also be used.

The electrolyte of the present embodiments is not particularly limited. In some embodiments, the electrolyte can be an inorganic electrolyte. In other embodiments, the electrolyte can be an organic electrolyte. As one of ordinary skill in the art will recognize, aqueous electrolytes offer low internal resistance values but have a working voltage range limited to about 1 V. In contrast, organic electrolytes have a working voltage range of up to about 2.5 V but have a higher internal resistance. As with other components of the present embodiments, the electrolyte identity and concentration can be altered to account for different end uses and electrical properties (e.g., capacitance).

Illustrative aqueous electrolytes include aqueous acid solutions (e.g., sulfuric acid, phosphoric acid, hydrochloric acid, and the like), aqueous base solutions (e.g., sodium hydroxide or potassium hydroxide), and neutral solutions. Neutral electrolyte solutions are generally formed by dissolving a salt in an aqueous medium. Illustrative salts that are suitable for use as neutral electrolytes include, for example, sodium chloride, potassium chloride, sodium oxide, potassium oxide, sodium sulfate, potassium sulfate, and the like. Additional aqueous electrolytes can be envisioned by those of ordinary skill in the art. In general, the concentration of the aqueous electrolyte ranges between about 0.1 M and about 20 M or between about 1 wt. % and 100 wt. %.

Organic electrolytes include an electrolytic species dissolved in an organic solvent. Illustrative electrolytic species include, for example, tetraalkylammonium salts (e.g., tetraethylammonium or tetramethylammonium halides and hydroxides); quaternary phosphonium salts; and lithium, sodium or potassium tetrafluoroborates, perchlorates, hexafluorophosphates, bis(trifluoromethane)sulfonates, bis(trifluoromethane)sulfonylimides, or tris(trifluoromethane) sulfonylmethides. In general, the concentration of the electrolytic species in the organic solvent ranges between about 0.1 M and about 5 M in some embodiments or between about 0.5 M and about 3 M in other embodiments.

Organic solvents used in organic electrolytes are generally aprotic organic solvents having a high dielectric constant. Illustrative organic solvents that can be used in an organic electrolyte include, without limitation, alkyl carbonates (e.g., propylene carbonate, ethylene carbonate, butylene carbonate, dimethyl carbonate, diethyl carbonate, dipropyl carbonate, methyl ethyl carbonate, methyl butyl carbonate, methyl propyl carbonate, ethyl propyl carbonate, butyl propyl carbonate, 1,2-butylene carbonate, 2,3-butylene carbonate, 1,2-pentene carbonate, and 2,3-pentene carbonate), nitriles (e.g., acetonitrile, acrylonitrile, propionitrile, butyronitrile and benzonitrile), sulfoxides (e.g., dimethyl sulfoxide, diethyl sulfoxide, ethyl methyl sulfoxide, and benzylmethyl sulfoxide), amides (e.g., formamide, methylformamide, and dimethylformamide), pyrrolidones (e.g., N-methylpyrrolidone), lactones (e.g., γ-butyrolactone, γ-valerolactone, 2-methyl-=-butyrolactone, and acetyl-γ-butyrolactone), phosphate triesters, nitromethane, ethers (e.g., 1,2-dimethoxyethane; 1,2-diethoxyethane; 1,2-methoxyethoxyethane; 1,2- or 1,3-dimethoxypropane; 1,2- or 1,3-diethoxypropane; 1,2- or 1,3-ethoxymethoxypropane; 1,2-dibutoxyethane; tetrahydrofuran; 2-methyltetrahydrofuran and other alkyl, dialkyl, alkoxy or dialkoxy tetrahydrofurans; 1,4-dioxane; 1,3-dioxolane; 1,4-dioxolane; 2-methyl-1,3-dioxolane; 4-methyl-1,3-dioxolane; sulfolane; 3-methylsulfolane; methyl ether; ethyl ether; propyl ether; diethylene glycol dialkyl ether; triethylene glycol dialkyl ethers; ethylene glycol dialkyl ethers; and tetraethylene glycol dialkyl ethers), esters (e.g., alkyl propionates such as methyl propionate and ethyl propionate, dialkyl malonates such as diethyl malonate, alkyl acetates such as methyl acetate and ethyl acetate, and alkyl formates such as methyl formate and ethyl formate); and maleic anhydride. In addition, organic gels and the like can be used, if desired.

In some embodiments, the electrolyte can be an ionic liquid such as, for example, benzyldimethylpropylammonium aluminum tetrachlorate, benzyldimethylammonium imide, ethylmethylammonium bisulfate, 1-butyl-3-methylimidazolium tetrafluoroborate, or tetraethylammonium tetrafluoroborate. Any of the above organic solvents can optionally be used in combination with such ionic liquids.

Capacitance values of the present supercapacitor embodiments can vary over a wide range. In various embodiments, the capacitance can range between about 0.1 and about 50 Farad/gram of substrate. In other embodiments, the capacitance can range between about 1 and about 25 Farad/gram of substrate. Depending on the size of the supercapacitor and the number of layers in the rolled structure, the total capacitance can be several thousand to tens of thousands of Farads. In addition, the present supercapacitors can be used singly or stacked in series. When used in series, the total capacitance can be increased further.

Figure 5:
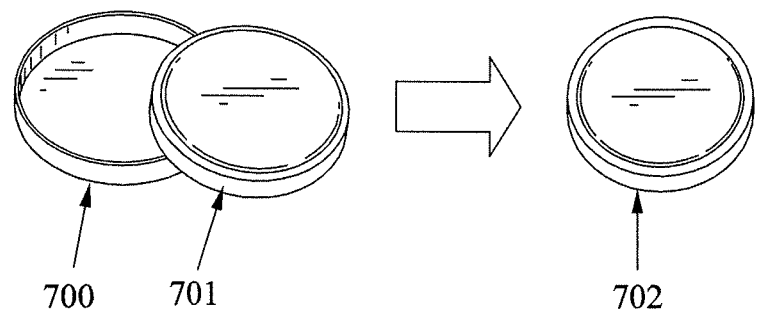
FIG. 5 shows a schematic of a coin press sample supercapacitor structure.
Figure 6:
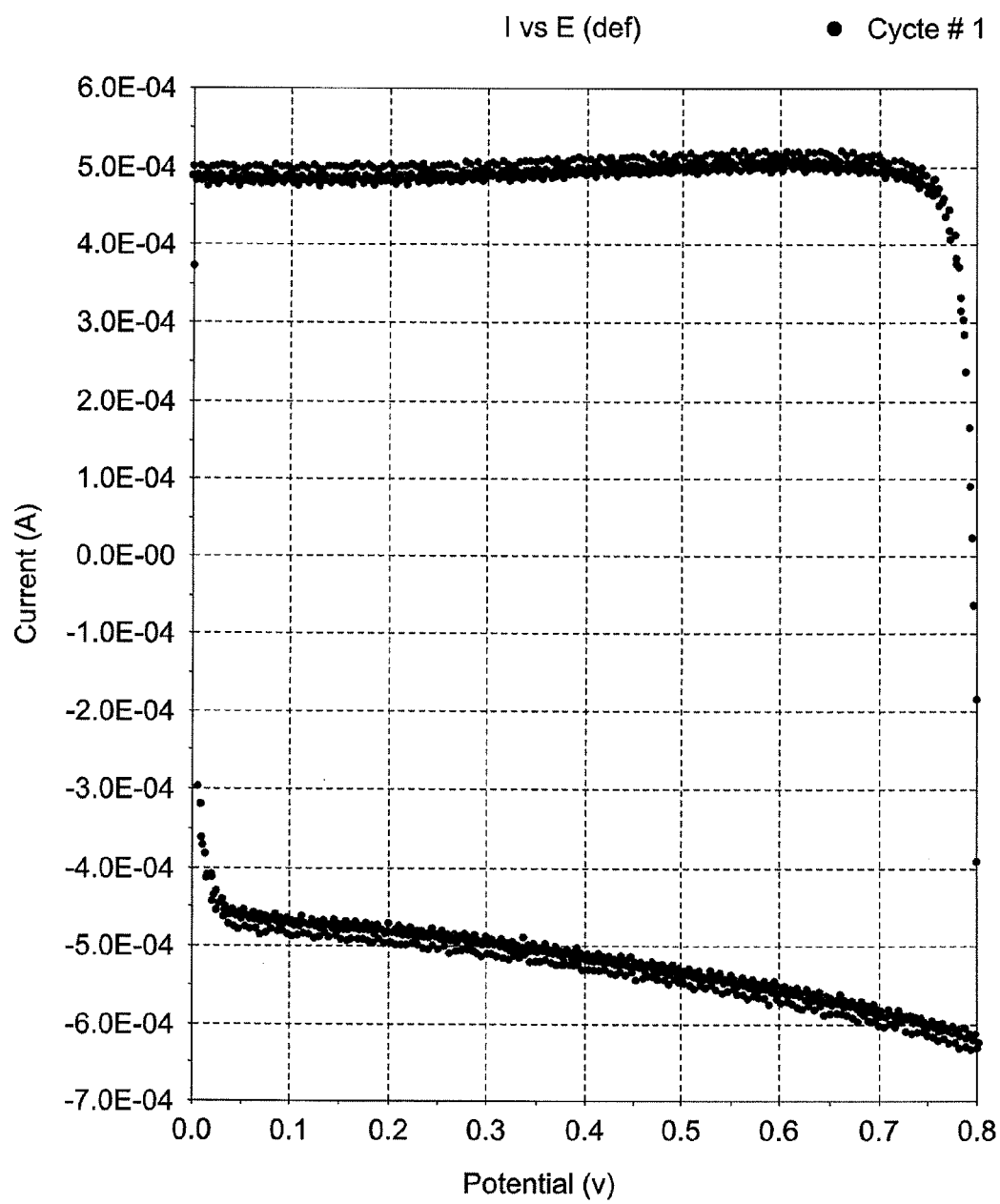
FIG. 6 shows an illustrative cyclic voltammogram of a supercapacitor of the present disclosure.

FIG. 5 shows a schematic of a coin press sample supercapacitor structure. Such a supercapacitor structure can be readily prepared for testing of the supercapacitors described herein by connecting outer portion 700 and inner portion 701 to form supercapacitor 702. FIG. 6 shows an illustrative cyclic voltammogram of a supercapacitor of the present disclosure.

In some embodiments, apparatuses are disclosed for preparing the electrical devices described herein. In some embodiments, apparatuses described herein include a carbon nanotube growth reactor, a first payout reel and a second payout reel upstream of the carbon nanotube growth reactor, a third payout reel downstream of the carbon nanotube growth reactor, and a takeup reel. The first payout reel and the second payout reel are operatively coupled to the carbon nanotube growth reactor so as to continuously transport a first substrate and a second substrate through the carbon nanotube growth reactor and to infuse carbon nanotubes thereto. The third payout reel is operatively coupled to an output of the carbon nanotube growth reactor so as to form a layered structure containing the first substrate, the second substrate, and an output of the third payout reel that is disposed between the first substrate and the second substrate. The takeup reel is operable for winding the layered structure in a spiral configuration about a central axis.

In some embodiments, the apparatuses further include a fourth payout reel downstream of the carbon nanotube growth reactor that is operatively coupled to an output of the carbon nanotube growth reactor and an output of the third payout reel so as to form a layered structure containing the first substrate, the second substrate, an output of the third payout reel and an output of the fourth payout reel. In such embodiments, the output of the third payout reel is disposed between the first substrate and the second substrate; and the second substrate is disposed between the output of the third payout reel and the output of the fourth payout reel in the layered structure. When in the layered structure, the first substrate and second substrate have carbon nanotubes infused thereto, since they have already been transported through the carbon nanotube growth reactor and exposed to carbon nanotube growth conditions.

Various other optional elements can also be included in the embodiments of the present apparatuses. In some embodiments, the apparatuses further include an electrolyte application station that is downstream of the third payout reel. In some embodiments, the apparatuses further include a catalyst application station that is upstream of the carbon nanotube growth reactor. In some embodiments, the apparatuses further include a sealing station that is upstream of the takeup reel. In some embodiments, all of these optional elements are present in the present apparatuses. In other embodiments, only one or more of the optional elements in present. Further, the various optional elements can be included in combination with the various embodiments in which a fourth payout reel is present. Further discussion of these and other elements are discussed below.

Figure 7:
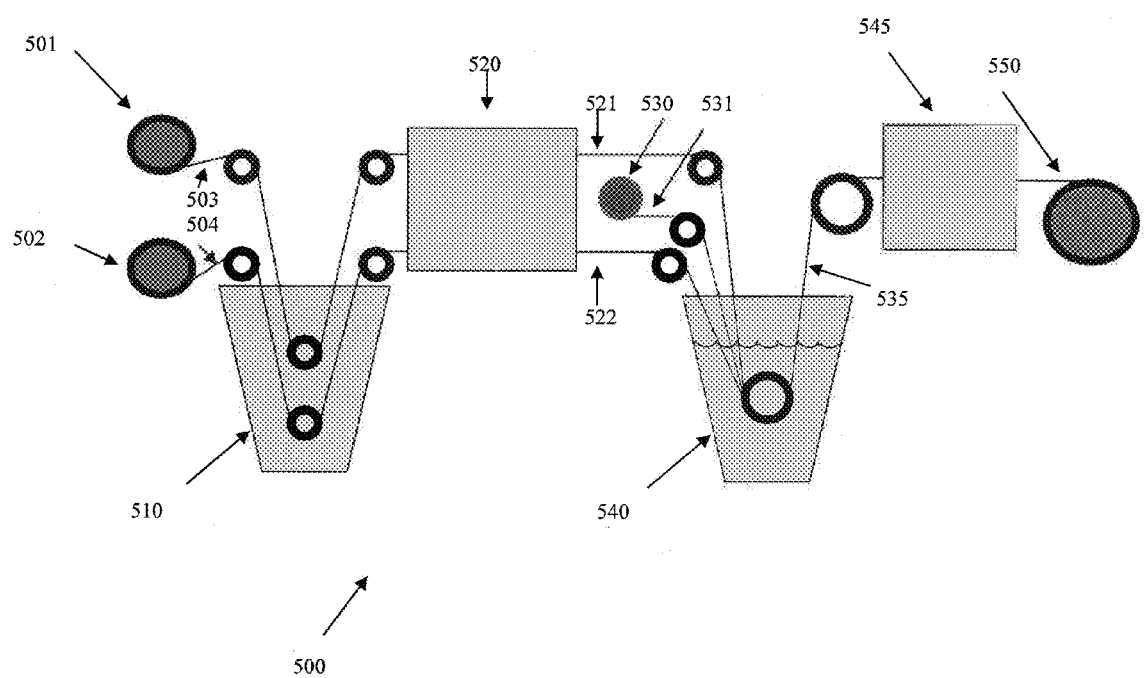
FIG. 7 shows a schematic of an illustrative apparatus used for preparing certain embodiments of the electrical devices described herein.

FIG. 7 shows a schematic of an illustrative apparatus 500 used for preparing certain embodiments of the electrical devices described herein. Apparatus 500 includes first payout reel 501 containing first continuous substrate 503 wound thereon and second payout reel 502 containing second continuous substrate 504 wound thereon. In the embodiment shown in FIG. 7, first continuous substrate 503 and second continuous substrate 504 are passed through catalyst application station 510, which deposits a catalyst operable for forming carbon nanotubes (e.g., catalytic nanoparticles) on continuous substrates 503 and 504. Optionally, catalyst application station 510 can be omitted, and continuous substrates 503 and 504 can already have catalytic nanoparticles deposited thereon when wound upon first payout reel 501 and second payout reel 502. After exiting catalyst application station 510, first continuous substrate 503 and second continuous substrate 504 are transported through carbon nanotube growth reactor 520 to infuse carbon nanotubes thereon. Additional details of carbon nanotube growth reactors are discussed further hereinbelow.

Apparatus 500 further includes third payout reel 530 downstream of carbon nanotube growth reactor 520. In embodiment depicted in FIG. 7, third payout reel 530 contains a separator material 531 wound thereon that is combined with an output of the carbon nanotube growth reactor (e.g., first carbon nanotube-infused substrate 521 and second carbon nanotube-infused substrate 522). Third payout reel 530 is configured such that first carbon nanotube-infused substrate 521 and second carbon nanotube-infused substrate 522 form a layered structure 535 with separator material 531 disposed therebetween. In some embodiments, layered structure 535 can be formed in an electrolyte reservoir in optional electrolyte application station 540. In alternative embodiments, the electrolyte can be applied at a later stage after layered structure 535 is formed, either before or after winding it into a spiral configuration.

After formation of layered structure 535, it is subsequently wound upon takeup reel 550 to produce an electrical device having a spiral configuration of electrode materials in accordance with the embodiments described above. Takeup reel 550 can be rotated in a clockwise or counterclockwise fashion to produce a spiral configuration wound in either direction.

Before reaching takeup reel 550, layered structure 535 can pass through optional sealing station 545. Sealing station 545 can be used to further compress layered structure 535 together and/or to apply an insulator material over layered structure 535 to provide electrical isolation of the electrode materials when wound in the spiral configuration. For example, sealing station 545 can apply an insulator material over second carbon nanotube-infused substrate 522 of layered structure 535 prior to reaching takeup reel 550. Optional crimping operations can also be performed in sealing station 545.

As noted above, electrical isolation can also be maintained by other means that do not involve an insulator material or can be used in combination with an insulator material. For example, the present apparatuses can be configured such that an edge of the first electrode material and an edge of the second electrode material are offset from one another in the electrical devices. Further, the apparatuses can also include additional payout reels for incorporating further separator material into the electrical devices, as shown in FIG. 8 and described below.

Figure 8:
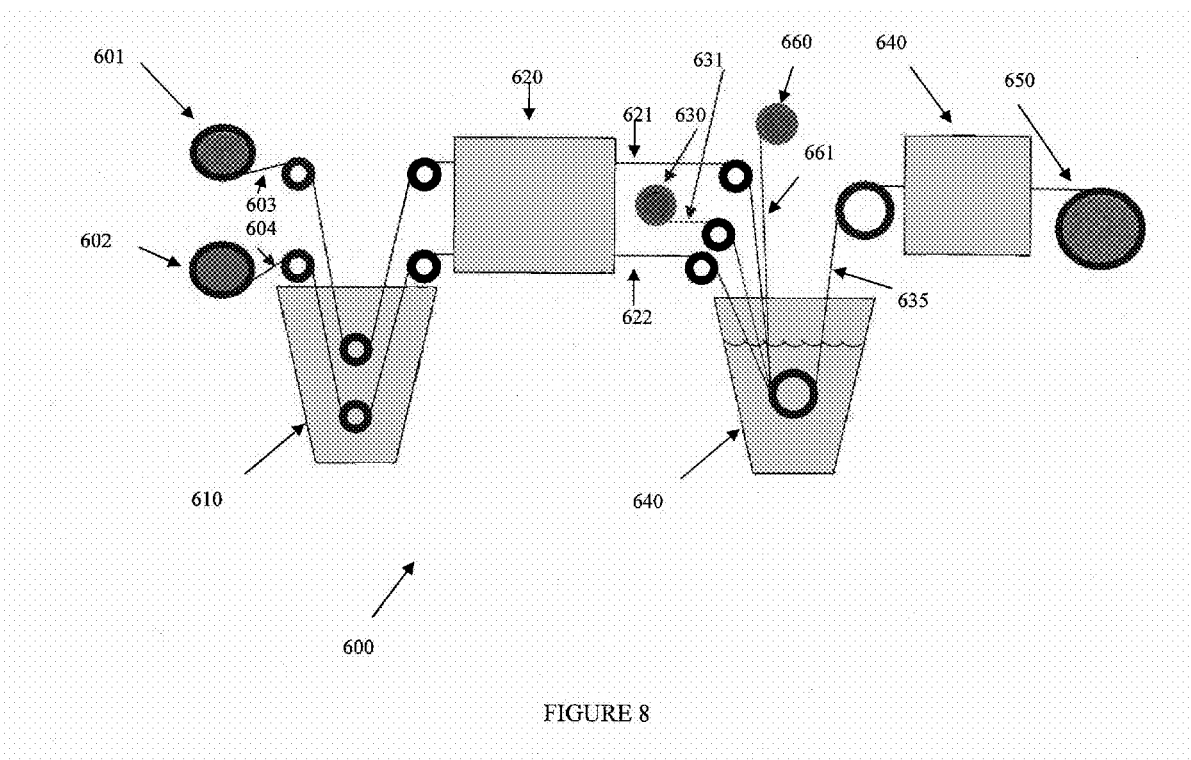
FIG. 8 shows a schematic of an illustrative apparatus for preparing alternative embodiments of the present electrical devices in which electrical isolation is achieved without sealing the spiral configuration with an insulator material.

FIG. 8 shows a schematic of an illustrative apparatus 600 for preparing alternative embodiments of the present electrical devices in which electrical isolation is achieved without sealing the spiral configuration with an insulator material. Apparatus 600 includes first payout reel 601 containing first continuous substrate 603 wound thereon, second payout reel 602 containing second continuous substrate 604 wound thereon, optional catalyst application station 610, carbon nanotube growth reactor 620, third payout reel 630 containing first separator material 631 wound thereon, optional electrolyte application station 640, and takeup reel 650, where these elements are analogous to those described above for FIG. 7. As also analogous to FIG. 7, apparatus 600 generates an output from carbon nanotube growth reactor 620 (e.g., first carbon nanotube-infused substrate 621 and second carbon nanotube-infused substrate 622).

Apparatus 600 further includes fourth payout reel 660 containing second separator material 661 wound thereon. As shown in FIG. 8, second separator material 661 of fourth payout reel 660 is combined with an output of carbon nanotube growth reactor 620 (e.g., first carbon nanotube-infused substrate 621 and second carbon nanotube-infused substrate 622) and an output of third payout reel 630 (e.g., first separator material 631) to form layered structure 635. In layered structure 635, second carbon nanotube-infused substrate 622 is disposed between first separator material 631 and second separator material 661, and first, separator material 631 is disposed between first carbon nanotube-infused substrate 621 and second carbon nanotube-infused substrate 622. That is, apparatus 600 is configured to produce a layered structure containing alternating layers of electrode material and separator material.

As described for FIG. 7, layered structure 635 can be formed in an electrolyte reservoir in optional electrolyte application station 640. In alternative embodiments, the electrolyte can be applied at a later stage after layered structure 635 is formed, either before or after winding it into a spiral configuration on takeup reel 650.

Apparatus 600 can also include optional crimping station 640. Unlike sealing station 540 of apparatus 500, there is no need to apply an insulator material to layered structure 635 in crimping station 600, since the electrode materials are already configured to be in electrical isolation from one another. In some embodiments, crimping station 640 can be used to compress the electrode materials together with the separator materials to produce more a compact form of the layered structure prior to winding the electrical device into a spiral configuration.

In some embodiments, methods for making the presently described electrical devices are described herein. In some embodiments, methods for making the electrical devices can make use of the apparatuses described above or various modifications thereof.

In some embodiments, methods described herein include providing a first electrode material containing a first plurality of carbon nanotubes infused to a first substrate, providing a second electrode material containing a second plurality of carbon nanotubes infused to a second substrate, forming a layered structure containing the first electrode material and the second electrode material, and winding the layered structure in a spiral configuration about a central axis.

In some embodiments, the first electrode material and the second electrode material are provided from a continuous carbon nanotube infusion process that is operatively coupled to the processes of forming a layered structure and winding the layered structure.

In some or other embodiments, methods described herein include providing a first substrate of spoolable dimensions on a first payout reel and a second substrate of spoolable dimensions on a second payout reel; transporting the first substrate and the second substrate through, a carbon nanotube growth reactor so as to infuse carbon nanotubes thereto, thereby forming a first electrode material containing a first plurality of carbon nanotubes infused to the first substrate and a second electrode material containing a second plurality of carbon nanotubes infused to the second substrate; forming a layered structure containing the first electrode material and the second electrode material; and winding the layered structure in a spiral configuration about a central axis. In some embodiments, these operations are operatively coupled to one another in a continuous process.

In some or other embodiments, the present methods further include applying catalytic nanoparticles to the first substrate and the second substrate. In some embodiments, the catalytic nanoparticles can be applied to the first substrate and the second substrate prior to their placement on the first payout reel and the second payout reel. In other embodiments, the catalytic nanoparticles can be applied in a continuous process to the first substrate and the second substrate prior to their entering a carbon nanotube growth reactor. For example, in some embodiments, catalytic nanoparticles can be applied to a first substrate and a second substrate in a catalyst application station containing a solution or suspension of catalytic nanoparticles or a precursor thereto.

In some embodiments of the present methods, the layered structure further contains a first separator material disposed between the first electrode material and the second electrode material, where the separator material is permeable to ions of an electrolyte. The separator material can maintain charge separation when the electrical devices are in a charged state, but allows current flow when the electrical devices are charging or discharging.

In some embodiments, the present methods further include exposing the layered structure to an electrolyte. In some embodiments, exposing the layered structure to an electrolyte takes place before winding the layered structure to form the spiral configuration of the electrical devices. For example, in some embodiments, forming the layered structure can take place in a reservoir of the electrolyte. When the layered structure is exposed to the electrolyte prior to winding, the present methods can further include sealing the layered structure with an insulator material prior to winding. By sealing the layered structure with an insulator material, electrolyte held therein can be more effectively contained. In alternative embodiments, exposing the layered structure to an electrolyte can take place after winding occurs. In some embodiments, the spiral configuration obtained from winding can be immersed in a reservoir of the electrolyte. In other embodiments, the spiral configuration can be partially immersed in a reservoir of the electrolyte. In either case, capillary action can ensure electrolyte penetration into the interior of the spiral configuration to ensure sufficient saturation of the electrode materials for adequate electrical conductivity to occur.

In some embodiments, the layered structure further contains an insulator material, where the insulator material is not adjacent to the first separator material. In such embodiments, the insulator material electrically isolates adjacent electrode layers in the spiral configuration of the electrical devices. In some embodiments, the insulator material can be applied concurrently with formation of the layered structure. For example, an insulator material can be disposed on the second electrode material of the layered structure as the layered structure is being formed or just after the layered structure is formed. In a non-limiting embodiment, an insulator material can be applied to the layered structure from a payout reel containing the insulator material. In other embodiments, the insulator material can be applied to the layered structure as a separate operation after formation of the layered structure. For example, application of the insulator material can occur in a sealing station, and optionally be combined with a crimping operation (see FIG. 7). In some embodiments, the present methods further include applying an insulator material over the outermost surface of the spiral configuration of the electrical devices, as shown for FIG. 3H.

In alternative embodiments, electrical isolation can be maintained without applying an insulator material to the layered structure. As previously described, electrical isolation can also be accomplished by applying a second separator material to the layered structure. In some embodiments, the layered structure further includes a second separator material that is not adjacent to the first separator material. That is, the present methods further include disposing the second separator material on the second electrode material of the layered structure. In such embodiments, the each electrode material in the spiral configuration is adjacent to either the first or second separator material, thereby providing electrical isolation therebetween.

In some embodiments of the present methods, the first substrate and the second substrate are of spoolable dimensions. That is, the first substrate and the second substrate are operable to be transformed to an electrical device in a continuous process in accordance with the present embodiments. In some embodiments, the first substrate and the second substrate can be a plurality of continuous fibers. In some embodiments, the continuous fibers can be electrically conductive. For example, in some embodiments, the continuous fibers can be carbon fibers and/or metal fibers. In some embodiments of the present methods, forms of the first substrate and the second substrate can include, for example, metal sheets, metal foils, metal films, graphite sheets, graphite films, woven sheets of continuous fibers, non-woven sheets of continuous fibers, plies of continuous fibers, mats of continuous fibers, ribbons of continuous fibers, and/or tapes of continuous fibers.

Embodiments disclosed herein utilize carbon nanotube-infused substrates that can be readily prepared by methods, or simple modifications thereof, described in commonly assigned, co-pending U.S. patent application Ser. Nos. 12/611,073, 12/611,101, 12/611,103, and 12/938,328, each of which is incorporated by reference herein in its entirety. A brief description of the processes described in these co-pending patent applications follows. These co-pending patent applications describe the infusion of carbon nanotubes to continuous fiber materials, but the methods described therein can be readily adapted to provide a carbon nanotube-infused substrate of any type. Although the brief description that follows is directed to continuous fiber materials, it should be recognized that any type of continuous substrate can be equivalently prepared by routine modification of the described methods.

To infuse carbon nanotubes to a fiber material, the carbon nanotubes are synthesized directly on the fiber material. In some embodiments, this is accomplished by first disposing a carbon nanotube-forming catalyst (e.g., catalytic nanoparticles) on the fiber material. A number of preparatory processes can be performed prior to this catalyst deposition.

In some embodiments, the fiber material can be optionally treated with a plasma to prepare the fiber surface to accept the catalyst. For example, a plasma treated glass fiber material can provide a roughened glass fiber surface in which the carbon nanotube-forming catalyst can be deposited. In some embodiments, the plasma also serves to "clean" the fiber surface. The plasma process for "roughing" the fiber surface thus facilitates catalyst deposition. The roughness is typically on the scale of nanometers. In the plasma treatment process, craters or depressions are formed that are nanometers deep and nanometers in diameter. Such surface modification can be achieved using a plasma of any one or more of a variety of different gases, including, without limitation, argon, helium, oxygen, ammonia, nitrogen and hydrogen.

In some embodiments, where a fiber material being employed has a sizing material associated with it, such sizing can be optionally removed prior to catalyst deposition. Optionally, the sizing material can be removed after catalyst deposition. In some embodiments, sizing material removal can be accomplished during carbon nanotube synthesis or just prior to carbon nanotube synthesis in a pre-heat step. In other embodiments, some sizing materials can remain throughout the entire carbon nanotube synthesis process.

Yet another optional step prior to or concomitant with the deposition of the carbon nanotube-forming catalyst (i.e., catalytic nanoparticles) is the application of a barrier coating on the fiber material. Barrier coatings are materials designed to protect the integrity of sensitive fiber materials, such as carbon fibers, organic fibers, glass fibers, metal fibers, and the like (e.g., a non-fibrous substrate). Such a barrier coating can include, for example, an alkoxysilane, an alumoxane, alumina nanoparticles, spin on glass and glass nanoparticles. For example, in an embodiment the barrier coating is Accuglass T-11 Spin-On Glass (Honeywell International Inc., Morristown, N.J.). The carbon nanotube-forming catalyst can be added to the uncured barrier coating material and then applied to the fiber material together, in one embodiment. In other embodiments, the barrier coating material can be added to the fiber material prior to deposition of the carbon nanotube-forming catalyst. In such embodiments, the barrier coating can be partially cured prior to catalyst deposition. The barrier coating material can be of a sufficiently thin thickness to allow exposure of the carbon nanotube-forming catalyst to the carbon feedstock gas for subsequent CVD- or like carbon nanotube growth process. In some embodiments, the barrier coating thickness is less than or about equal to the effective diameter of the carbon nanotube-forming catalyst. Once the carbon nanotube-forming catalyst and the barrier coating are in place, the barrier coating can be fully cured. In some embodiments, the thickness of the barrier coating can be greater than the effective diameter of the carbon nanotube-forming catalyst so long as it still permits access of carbon feedstock gases to the sites of the catalyst. Such barrier coatings can be sufficiently porous to allow access of carbon feedstock gases to the carbon nanotube-forming catalyst.

In some embodiments, the thickness of the barrier coating ranges between about 10 nm and about 100 nm. In other embodiments, the thickness of the barrier coating ranges between about 10 nm and about 50 nm, including 40 nm. In some embodiments, the thickness of the barrier coating is less than about 10 nm, including about 1 nm, about 2 nm, about 3 nm, about 4 nm, about 5 nm, about 6 nm, about 7 nm, about 8 nm, about 9 nm, and about 10 nm, including all values and subranges therebetween.

Without being bound by theory, the barrier coating can serve as an intermediate layer between the fiber material and the carbon nanotubes and mechanically infuses the carbon nanotubes to the fiber material. Such mechanical infusion via a barrier coating provides a robust system for carbon nanotube growth in which the fiber material serves as a platform for organizing the carbon nanotubes, while still allowing the beneficial carbon nanotube properties to be conveyed to the fiber material. Moreover, benefits of including a barrier coating include, for example, protection of the fiber material from chemical damage due to moisture exposure and/or thermal damage at the elevated temperatures used to promote carbon nanotube growth.

As described further below, the carbon nanotube-forming catalyst can be prepared as a liquid solution that contains the carbon nanotube-forming catalyst as transition metal catalytic nanoparticles. The diameters of the synthesized carbon nanotubes are related to the size of the transition metal catalytic nanoparticles as described above.

Carbon nanotube synthesis can be based on a chemical vapor deposition (CVD) process or related carbon nanotube growth process which occurs at elevated temperatures. In some embodiments, the CVD-based growth process can, be plasma-enhanced by providing an electric field during the growth process such, that the carbon nanotube growth follows the direction of the electric field. Other illustrative carbon nanotube growth processes include, for example, micro-cavity, laser ablation, flame synthesis, arc discharge, and high pressure carbon monoxide (HiPCO) synthesis. The specific temperature is a function of catalyst choice, but can typically be in a range of about 500° C. to about 1000° C. Accordingly, carbon nanotube synthesis involves heating the fiber material to a temperature in the aforementioned range to support carbon nanotube growth.

In some embodiments, CVD-promoted carbon nanotube growth on the catalyst-laden fiber material is performed. The CVD process can be promoted by, for example, a carbon-containing feedstock gas such as acetylene, ethylene, and/or ethanol. The carbon nanotube growth processes also generally use an inert gas (e.g., nitrogen, argon, and/or helium) as a primary carrier gas. The carbon-containing feedstock gas is typically provided in a range from between about 0% to about 15% of the total mixture. A substantially inert environment for CVD growth can be prepared by removal of moisture and oxygen from the growth chamber.

In the carbon nanotube growth process, carbon nanotubes grow at the sites of transition metal catalytic nanoparticles that are operable for carbon nanotube growth. The presence of a strong plasma-creating electric field can be optionally employed to affect carbon nanotube growth. That is, the growth tends to follow the direction of the electric field. By properly adjusting the geometry of the plasma spray and electric field, vertically aligned carbon nanotubes (i.e., perpendicular to the surface of the fiber material) can be synthesized. Under certain conditions, even in the absence of a plasma, closely-spaced carbon nanotubes can maintain a substantially vertical growth direction resulting in a dense array of carbon nanotubes resembling a carpet or forest.

Returning to the catalyst deposition process, a carbon nanotube-forming catalyst is deposited to provide a layer (typically no more than a monolayer) of catalytic nanoparticles on the fiber material for the purpose of growing carbon nanotubes thereon. The operation of depositing catalytic nanoparticles on the fiber material can be accomplished by a number of techniques including, for example, spraying or dip coating a solution of catalytic nanoparticles or by gas phase deposition, which can occur by a plasma process. Thus, in some embodiments, after forming a catalyst solution in a solvent, the catalyst can be applied by spraying or dip coating the fiber material with the solution, or combinations of spraying and dip coating. Either technique, used alone or in combination, can be employed once, twice, thrice, four times, up to any number of times to provide a fiber material that is sufficiently uniformly coated with catalytic nanoparticles that are operable for formation of carbon nanotubes. When dip coating is employed, for example, a fiber material can be placed in a first dip bath for a first residence time in the first dip bath. When employing a second dip bath, the fiber material can be placed in the second dip bath for a second residence time. For example, fiber materials can be subjected to a solution of carbon nanotube-forming catalyst for between about 3 seconds to about 90 seconds depending on the dip configuration and linespeed. Employing spraying or dip coating processes, a fiber material with a catalyst surface density of less than about 5% surface coverage to as high as about 80% surface coverage can be obtained. At higher surface densities (e g., about 80%), the carbon nanotube-forming catalyst nanoparticles are nearly a monolayer. In some embodiments, the process of coating the carbon nanotube-forming catalyst on the fiber material produces no more than a monolayer. For example, carbon nanotube growth on a stack of carbon nanotube-forming catalyst can erode the degree of infusion of the carbon nanotubes to the fiber material. In other embodiments, transition metal catalytic nanoparticles can be deposited on the fiber material using evaporation techniques, electrolytic deposition techniques, and other processes known to those of ordinary skill in the art, such as addition of the transition metal catalyst to a plasma feedstock gas as a metal organic, metal salt or other composition promoting gas phase transport.

Because processes to manufacture carbon nanotube-infused fibers are designed to be continuous, a spoolable fiber material can be dip-coated in a series of baths where dip coating baths are spatially separated. In a continuous process in which nascent fibers are being generated de novo, such as newly formed glass fibers from a furnace, dip bath or spraying of a carbon nanotube-forming catalyst can be the first step after sufficiently cooling the newly formed fiber material. In some embodiments, cooling of newly formed glass fibers can be accomplished with a cooling jet of water which has the carbon nanotube-forming catalyst particles dispersed therein.

In some embodiments, application of a carbon nanotube-forming catalyst can be performed in lieu of application of a sizing when generating a fiber and infusing it with carbon nanotubes in a continuous process. In other embodiments, the carbon nanotube-forming catalyst can be applied to newly formed fiber materials in the presence of other sizing agents. Such simultaneous application of a carbon nanotube-forming catalyst and other sizing agents can provide the carbon nanotube-forming catalyst in surface contact with the fiber material to ensure carbon nanotube infusion. In yet further embodiments, the carbon nanotube-forming catalyst can be applied to nascent fibers by spray or dip coating while the fiber material is in a sufficiently softened state, for example, near or below the annealing temperature, such that the carbon nanotube-forming catalyst is slightly embedded in the surface of the fiber material. When depositing the carbon nanotube-forming catalyst on hot glass fiber materials, for example, care should be given to not exceed the melting point of the carbon nanotube-forming catalyst, thereby causing nanoparticle fusion and loss of control of the carbon nanotube characteristics (e.g., diameter) as a result.

Carbon nanotubes infused to a fiber material can serve to protect the fiber material from conditions including, for example, moisture, oxidation, abrasion, compression and/or other environmental conditions. In this case, the carbon nanotubes themselves can act as a sizing agent. Such a carbon nanotube-based sizing agent can be applied to a fiber material in lieu of or in addition to conventional sizing agents. When present, conventional sizing agents can be applied before or after the infusion and growth of carbon nanotubes on the fiber material. Conventional sizing agents vary widely in type and function and include, for example, surfactants, anti-static agents, lubricants, siloxanes, alkoxysilanes, aminosilanes, silanes, silanols, polyvinyl alcohol, starch, and mixtures thereof. Such conventional sizing agents can be used to protect the carbon nanotubes themselves from various conditions or to convey further properties to the fiber material that are not imparted by the carbon nanotubes. In some embodiments, a conventional sizing agent can be removed from the fiber material prior to carbon nanotube growth. Optionally, a conventional sizing agent can be replaced with another conventional sizing agent that is more compatible with the carbon nanotubes or the carbon nanotube growth conditions.

The carbon nanotube-forming catalyst solution can be a transition metal nanoparticle solution of any d-block transition metal. In addition, the nanoparticles can include alloys and non-alloy mixtures of d-block metals in elemental form, in salt form, and mixtures thereof Such salt forms include, without limitation, oxides, carbides, and nitrides, acetates, nitrates, and the like. Non-limiting illustrative transition metal nanoparticles include, for example, Ni, Fe, Co, Mo, Cu, Pt, Au, and Ag, salts thereof and mixtures thereof Many transition metal nanoparticle catalysts are readily commercially available from a variety of suppliers, including, for example, Ferrotec Corporation (Bedford, N.H.).

Catalyst solutions used for applying the carbon nanotube-forming catalyst to the fiber material can be in any common solvent that allows the carbon nanotube-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate, dispersion of the carbon nanotube-forming catalytic nanoparticles therein. Concentrations of carbon nanotube-forming catalyst in the catalyst solution can be in a range from about 1:1 to about 1:10,000 catalyst to solvent.

In some embodiments, after applying the carbon nanotube-forming catalyst to the fiber material, the fiber material can be optionally heated to a softening temperature. This step can aid in embedding the carbon nanotube-forming catalyst in the surface of the fiber material to encourage seeded growth and prevent tip growth where the catalyst floats at the tip of the leading edge a growing carbon nanotube. In some embodiments heating of the fiber material after disposing the carbon nanotube-forming catalyst on the fiber material can be at a temperature between about 500° C. and about 1000° C. Heating to such temperatures, which can also be used for carbon nanotube growth, can serve to remove any pre-existing sizing agents on the fiber material allowing deposition of the carbon nanotube-forming catalyst directly on the fiber material. In some embodiments, the carbon nanotube-forming catalyst can also be placed on the surface of a sizing coating prior to heating. The heating step can be used to remove sizing material while leaving the carbon nanotube-forming catalyst disposed on the surface of the fiber material. Heating at these temperatures can be performed prior to or substantially simultaneously with the introduction of a carbon-containing feedstock gas for carbon nanotube growth.

In some embodiments, the process of infusing carbon nanotubes to a fiber material includes removing sizing agents from the fiber material, applying a carbon nanotube-forming catalyst to the fiber material after sizing removal, heating the fiber material to at least about 500° C., and synthesizing carbon nanotubes on the fiber material. In some embodiments, operations of the carbon nanotube infusion process include removing sizing from a fiber material, applying a carbon nanotube-forming catalyst to the fiber material, heating the fiber material to a temperature operable for carbon nanotube synthesis and spraying a carbon plasma onto the catalyst-laden fiber material. Thus, where commercial fiber materials are employed, processes for constructing, carbon nanotube-infused fibers can include a discrete step of removing sizing from the fiber material before disposing the catalytic nanoparticles on the fiber material. Some commercial sizing materials, if present, can prevent surface contact of the carbon nanotube-forming catalyst with the fiber material and inhibit carbon nanotube infusion to the fiber material. In some embodiments, where sizing removal is assured under carbon nanotube growth conditions, sizing removal can be performed after deposition of the carbon nanotube-forming catalyst but just prior to or during providing a carbon-containing feedstock gas.

The step of synthesizing carbon nanotubes can include numerous techniques for forming carbon nanotubes, including, without limitation, micro-cavity, thermal or plasma-enhanced CVD techniques, laser ablation, arc discharge, flame synthesis, and high pressure carbon monoxide (HiPCO). During CVD, in particular, a sized fiber material with carbon nanotube-forming catalyst disposed thereon, can be used directly. In some embodiments, any conventional sizing agents can be removed during carbon nanotube synthesis. In some embodiments other sizing agents are not removed, but do not hinder carbon nanotube synthesis and infusion to the fiber material due to the diffusion of the carbon-containing feedstock gas through the sizing. In some embodiments, acetylene gas can be ionized to create a jet of cold carbon plasma for carbon nanotube synthesis. The plasma is directed toward the catalyst-laden fiber material. Thus, in some embodiments synthesizing carbon nanotubes on a fiber material includes (a) forming a carbon plasma; and (b) directing the carbon plasma onto the catalyst disposed on the fiber material. The diameters of the carbon nanotubes that are grown are dictated by the size of the carbon nanotube-forming catalyst. In some embodiments, a sized fiber material can be heated to between about 550° C. and about 800° C. to facilitate carbon nanotube growth. To initiate the growth of carbon nanotubes, two or more gases are bled into the reactor: an inert carrier gas (e.g., argon, helium, or nitrogen) and a carbon-containing feedstock gas (e.g., acetylene, ethylene, ethanol or methane). Carbon nanotubes grow at the sites of the carbon nanotube-forming catalyst.

In some embodiments, a CVD growth process can be plasma-enhanced. A plasma can be generated by providing an electric field during the growth process. Carbon nanotubes grown under these conditions can follow the direction of the electric field. Thus, by adjusting the geometry of the reactor, vertically aligned carbon nanotubes can be grown where the carbon nanotubes are substantially perpendicular to the surface of the fiber material (i.e., radial growth). In some embodiments, a plasma is not required for radial growth to occur about the fiber material. For fiber materials that have distinct sides such as, for example, tapes, mats, fabrics, plies, and the like, the carbon nanotube-forming catalyst can be disposed on one or both sides of the fiber material. Correspondingly, under such conditions, carbon nanotubes can be grown on one or both sides of the fiber material as well.

As described above, the carbon nanotube synthesis is performed at a rate sufficient to provide a continuous process for infusing spoolable length fiber materials with carbon nanotubes. Numerous apparatus configurations facilitate such a continuous synthesis as exemplified below.

In some embodiments, carbon nanotube-infused fiber materials can be prepared in an "all-plasma" process. In such embodiments, the fiber materials pass through numerous plasma-mediated steps to form the final carbon nanotube-infused fiber materials. The first of the plasma processes, can include a step of fiber surface modification. This is a plasma process for "roughing" the surface of the fiber material to facilitate catalyst deposition, as described above. As also described above, surface modification can be achieved using a plasma of any one or more of a variety of different gases, including, without limitation, argon, helium, oxygen, ammonia, hydrogen, and nitrogen.

After surface modification, the fiber material proceeds to catalyst application. In the present all-plasma process, this step is a plasma process for depositing the carbon nanotube-forming catalyst on the fiber material. The carbon nanotube-forming catalyst is typically a transition metal as described above. The transition metal catalyst can be added to a plasma feedstock gas as a precursor in non-limiting forms including, for example, a ferrofluid, a metal organic, a metal salt, mixtures thereof or any other composition suitable for promoting gas phase transport. The carbon nanotube-forming catalyst can be applied at room temperature in ambient environment with neither vacuum nor an inert atmosphere being required. In some embodiments, the fiber material can be cooled prior to catalyst application.

Continuing the all-plasma process, carbon nanotube synthesis occurs in a carbon nanotube-growth reactor. Carbon nanotube growth can be achieved through the use of plasma-enhanced chemical vapor deposition, wherein carbon plasma is sprayed onto the catalyst-laden fibers. Since carbon nanotube growth occurs at elevated temperatures (typically in a range of about 500° C. to about 1000° C. depending on the catalyst), the catalyst-laden fibers can be heated prior to being exposed to the carbon plasma. For the carbon nanotube infusion process, the fiber material can be optionally heated until softening occurs. After heating, the fiber material is ready to receive the carbon plasma. The carbon plasma can be generated, for example, by passing a carbon-containing feedstock gas such as, for example, acetylene, ethylene, ethanol, and the like, through an electric field that is capable of ionizing the gas. This cold carbon plasma is directed, via spray nozzles, to the fiber material. The fiber material can be in close proximity to the spray nozzles, such as within about 1 centimeter of the spray nozzles, to receive the plasma. In some embodiments, heaters can be disposed above the fiber material at the plasma sprayers to maintain the elevated temperature of the fiber material.

Another configuration for continuous carbon nanotube synthesis involves a special rectangular reactor for the synthesis and growth of carbon nanotubes directly on fiber materials. The reactor can be designed for use in a continuous in-line process for producing carbon nanotube-infused fiber materials. In some embodiments, carbon nanotubes are grown via a CVD process at atmospheric pressure and an elevated temperature in the range of about 550° C. and about 800° C. in a multi-zone reactor. The fact that the carbon nanotube synthesis occurs at atmospheric pressure is one factor that facilitates the incorporation of the reactor into a continuous processing line for carbon nanotube infusion to the fiber materials. Another advantage consistent with in-line continuous processing using such a zone reactor is that carbon nanotube growth occurs in seconds, as opposed to minutes (or longer), as in other procedures and apparatus configurations typical in the art.

Carbon nanotube synthesis reactors in accordance with the various embodiments include the following features:

Rectangular Configured Synthesis Reactors:

The cross-section of a typical carbon nanotube synthesis reactor known in the art is circular. There are a number of reasons for this including, for example, historical reasons (e.g., cylindrical reactors are often used in laboratories) and convenience (e.g., flow dynamics are easy to model in cylindrical reactors, heater systems readily accept circular tubes (e.g., quartz, etc.), and ease of manufacturing. Departing from the cylindrical convention, the present disclosure provides a carbon nanotube synthesis reactor having a rectangular cross section. The reasons for the departure include at least the following:

1) Inefficient Use of Reactor Volume.

Since many fiber materials that can be processed by the reactor are relatively planar (e.g., flat tapes, sheet-like forms, or spread tows or rovings), a circular cross-section is an inefficient use of the reactor volume. This inefficiency results in several drawbacks for cylindrical carbon nanotube synthesis reactors including, for example, a) maintaining a sufficient system purge; increased reactor volume requires increased gas flow rates to maintain the same level of gas purge, resulting in inefficiencies for high volume production of carbon nanotubes in an open environment; b) increased carbon-containing feedstock gas flow rates; the relative increase in inert gas flow for system purge, as per a) above, requires increased carbon-containing feedstock gas flow rates. Consider that the volume of an illustrative 12K glass fiber roving is approximately 2000 times less than the total, volume of a synthesis reactor having a rectangular cross-section. In an equivalent cylindrical reactor (i.e., a cylindrical reactor that has a width that accommodates the same planarized glass fiber material as the rectangular cross-section reactor), the volume of the glass fiber material is approximately 17,500 times less than the volume of the reactor. Although gas deposition processes, such as CVD, are typically governed by pressure and temperature alone, volume can have a significant impact on the efficiency of deposition. With a rectangular reactor there is a still excess volume, and this excess volume facilitates unwanted reactions. However, a cylindrical reactor has about eight times that volume available for facilitating unwanted reactions. Due to this greater opportunity for competing reactions to occur, the desired reactions effectively occur more slowly in a cylindrical reactor. Such a slow down in carbon nanotube growth, is problematic for the development of continuous growth processes. Another benefit of a rectangular reactor configuration is that the reactor volume can be decreased further still by using a small height for the rectangular chamber to make the volume ratio better and the reactions even more efficient. In some embodiments disclosed herein, the total volume of a rectangular synthesis reactor is no more than about 3000 times greater than the total volume of a fiber material being passed through the synthesis reactor. In some further embodiments, the total volume of the rectangular synthesis reactor is no more than about 4000 times greater than the total volume of the fiber material being passed through the synthesis reactor. In some still further embodiments, the total volume of the rectangular synthesis reactor is less than about 10,000 times greater than the total volume of the fiber material being passed through the synthesis reactor. Additionally, it is notable that when using a cylindrical reactor, more carbon-containing feedstock gas is required to provide the same flow percent as compared to reactors having a rectangular cross section. It should be appreciated that in some other embodiments, the synthesis reactor has a cross-section that is described by polygonal forms that are not rectangular, but are relatively similar thereto and provide a similar reduction in reactor volume relative to a reactor having a circular cross section; and c) problematic temperature distribution; when a relatively small-diameter reactor is used, the temperature gradient from the center of the chamber to the walls thereof is minimal, but with increased reactor size, such as would be used for commercial-scale production, such temperature gradients increase. Temperature gradients result in product quality variations across the fiber material (i.e., product quality varies as a function of radial position). This problem is substantially avoided when using a reactor having a rectangular cross-section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided.

2) Gas Introduction.

Because tubular furnaces are normally employed in the art, typical carbon nanotube synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall carbon nanotube growth rate because the incoming feedstock gas is continuously replenishing at the hottest portion of the system, which is where carbon nanotube growth is most active.

Zoning.

Chambers that provide a relatively cool purge zone extend from both ends of the rectangular synthesis reactor. Applicants have determined that if a hot gas were to mix with the external environment (i.e., outside of the rectangular reactor), there would be increased degradation of the fiber material. The cool purge zones provide a buffer between the internal system and external environments. Carbon nanotube synthesis reactor configurations known in the art typically require that the substrate is carefully (and slowly) cooled. The cool purge zone at the exit of the present rectangular carbon nanotube growth reactor achieves the cooling in a short period of time, as required for continuous in-line processing.

Non-contact, Hot-Walled, Metallic Reactor.

In some embodiments, a metallic hot-walled reactor (e.g., stainless steel) is employed. Use of this type of reactor can appear counterintuitive because metal, and stainless steel in particular, is more susceptible to carbon deposition (i.e., soot and by-product formation). Thus, most carbon nanotube synthesis reactors are made from quartz because there is less carbon deposited, quartz is easier to clean, and quartz facilitates sample observation. However, Applicants have observed that the increased soot and carbon deposition on stainless steel results in more consistent, efficient, faster, and stable carbon nanotube growth. Without being bound by theory it has been indicated that, in conjunction with atmospheric operation, the CVD process occurring in the reactor is diffusion limited. That is, the carbon nanotube-forming catalyst is "overfed;" too much carbon is available in the reactor system due to its relatively higher partial pressure (than if the reactor was operating under partial vacuum). As a consequence, in an open system—especially a clean one—too much carbon can adhere to the particles of carbon nanotube-forming catalyst, compromising their ability to synthesize carbon nanotubes. In some embodiments, the rectangular reactor is intentionally run when the reactor is "dirty," that is with soot deposited on the metallic reactor walls. Once carbon deposits to a monolayer on the walls of the reactor, carbon will readily deposit over itself Since some of the available carbon is "withdrawn" due to this mechanism, the remaining carbon feedstock, in the form of radicals, reacts with the carbon nanotube-forming catalyst at a rate that does not poison the catalyst. Existing systems run "cleanly" which, if they were open for continuous processing, would produce a much lower yield of carbon nanotubes at reduced growth rates.

Although it is generally beneficial to perform carbon nanotube synthesis "dirty" as described above, certain portions of the apparatus (e.g., gas manifolds and inlets) can nonetheless negatively impact the carbon nanotube growth process when soot creates blockages. In order to combat this problem, such areas of the carbon nanotube growth reaction chamber can be protected with soot inhibiting coatings such as, for example, silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and Carbon Nanotube Synthesis.

In the carbon nanotube synthesis reactor disclosed herein, both catalyst reduction and carbon nanotube growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present disclosure due, at least in part, to the fact that carbon-containing feedstock gas is introduced at the center of the reactor, not the end as would be typical in the art using cylindrical reactors. The reduction process occurs as the fiber material enters the heated zone. By this point, the gas has had time to react with the walls and cool off prior to reducing the catalyst (via hydrogen radical interactions). It is this transition region where the reduction occurs. At the hottest isothermal zone in the system, carbon nanotube growth occurs, with the greatest growth rate occurring proximal to the gas inlets near the center of the reactor.

In some embodiments, when loosely affiliated fiber materials including, for example, tows or rovings are employed (e.g., a glass roving), the continuous process can include steps that spread out the strands and/or filaments of the tow or roving. Thus, as a tow or roving is unspooled it can be spread using, a vacuum-based fiber spreading system, for example. When employing sized glass fiber rovings, for example, which can be relatively stiff, additional heating can be employed in order to "soften" the roving to facilitate fiber spreading. The spread fibers which contain individual filaments can be spread apart sufficiently to expose an entire surface area of the filaments, thus allowing the roving to more efficiently react in subsequent process steps. For example, a spread tow or roving can pass through a surface treatment step that is composed of a plasma system as described above. The roughened, spread fibers then can pass through a carbon nanotube-forming catalyst dip bath. The result is fibers of the glass roving that have catalyst particles distributed radially on their surface. The catalyzed-laden fibers of the roving then enter an appropriate carbon nanotube growth chamber, such as the rectangular chamber described above, where a flow through atmospheric pressure CVD or plasma enhanced-CVD process is used to synthesize carbon nanotubes at rates as high as several microns per second. The fibers of the roving, now having radially aligned carbon nanotubes thereon, exit the carbon nanotube growth reactor.

It is to be understood that modifications which do not substantially affect the activity of the various embodiments of this invention are also included within the definition of the invention provided herein. Accordingly, the following examples are intended to illustrate but not limit the present invention.

What is claimed is:

1. An electrical device comprising:
   a first electrode material comprising a first plurality of carbon nanotubes grown directly on, and infused to, a first substrate; and
   a second electrode material comprising a second plurality of carbon nanotubes infused to a second substrate;
   wherein the first electrode material and the second electrode material are wound in a spiral configuration about a central axis.

2. The electrical device of claim 1, further comprising:
   an electrolyte in contact with the first electrode material and the second electrode material; and
   a first separator material disposed between the first electrode material and the second electrode material;
   wherein the first separator material is permeable to ions of the electrolyte.

3. The electrical device of claim 2, wherein the electrical device comprises a supercapacitor.

4. The electrical device of claim 2, wherein the electrolyte comprises an inorganic electrolyte.

5. The electrical device of claim 2, wherein the electrolyte comprises an organic electrolyte.

6. The electrical device of claim 2, further comprising:
   an insulator material;
   wherein the insulator material is not adjacent to the first separator material.

7. The electrical device of claim 2, further comprising:
   a second separator material;
   wherein the second separator material is not adjacent to the first separator material.

8. The electrical device of claim 2, wherein an edge of the first electrode material and an edge of the second electrode material are offset from one another.

9. The electrical device of claim 1, wherein the first substrate and the second substrate comprise a plurality of continuous fibers.

10. The electrical device of claim 9, wherein the continuous fibers are selected from the group consisting of carbon fibers, metal fibers and combinations thereof.

11. The electrical device of claim 1, wherein the first substrate and the second substrate comprise a form selected from the group consisting of a metal sheet, a metal foil, a metal film, a graphite sheet, a graphite film, a woven sheet of continuous fibers, a non-woven sheet of continuous fibers, a ply of continuous fibers, a mat of continuous fibers, a ribbon of continuous fibers, a tape of continuous fibers, and combinations thereof.

12. The electrical device of claim 1, wherein the first substrate and the second substrate are electrically conductive before being infused with carbon nanotubes.

13. The electrical device of claim 1, further comprising:
an insulator material coating the outermost surface of the spiral configuration.

14. The electrical device of claim 1, further comprising:
a first electrode terminal in contact with the first electrode material; and
a second electrode terminal in contact with the second electrode material.

15. The electrical device of claim 1, wherein the carbon nanotubes are substantially perpendicular to the surface of the substrate to which they are infused.

16. The electrical device of claim 1, wherein the first plurality of carbon nanotubes are grown directly on the first substrate by transporting the first substrate through a carbon nanotube growth reactor.

\* \* \* \* \*